(12) United States Patent
Aminaka et al.

(10) Patent No.: US 8,570,886 B2
(45) Date of Patent: Oct. 29, 2013

(54) COMMUNICATION SYSTEM, MOBILE STATION, BASE STATION, RESPONSE DECISION METHOD, RESOURCE CONFIGURATION DECISION METHOD, AND PROGRAM

(75) Inventors: Hiroaki Aminaka, Tokyo (JP); Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 257 days.

(21) Appl. No.: 12/920,419

(22) PCT Filed: Dec. 5, 2008

(86) PCT No.: PCT/JP2008/072122
§ 371 (c)(1),
(2), (4) Date: Aug. 31, 2010

(87) PCT Pub. No.: WO2009/116212
PCT Pub. Date: Sep. 24, 2009

(65) Prior Publication Data
US 2011/0007700 A1 Jan. 13, 2011

(30) Foreign Application Priority Data
Mar. 19, 2008 (JP) ................. 2008-072580

(51) Int. Cl.
*H04J 1/16* (2006.01)
*H04J 3/16* (2006.01)
(52) U.S. Cl.
USPC ........................... 370/252; 370/328; 370/465
(58) Field of Classification Search
USPC ......................................... 370/252, 328, 465
See application file for complete search history.

(56) References Cited

U.S. PATENT DOCUMENTS

| 2007/0147326 | A1 | 6/2007 | Chen |
| 2009/0086673 | A1* | 4/2009 | Aminaka et al. ............... 370/329 |
| 2010/0298019 | A1* | 11/2010 | Pradas et al. ................... 455/509 |
| 2012/0155420 | A1* | 6/2012 | Sambhwani et al. ......... 370/329 |

FOREIGN PATENT DOCUMENTS

| JP | 2005-518113 A | 6/2005 |
| JP | 2007-097223 A | 4/2007 |

OTHER PUBLICATIONS

"Introduction of E-AICH for the purpose of E-DCH Resource Configuration Allocation", Qualcomm Europe, Ericsson, Huawei, Motorola, NEC, Nokia, Nokia Siemens Networks, NXP, Philips, 25.211 CR Draft, R1-080835, 3GPP TSG-RAN WGI Meeting #52, Feb. 2008, pp. 1-7.
"Error Performance Analysis of AICH/E-AICH based E-DCH resource allocation scheme" Qualcomm Europe, R1-080810, 3GPP TSG-RAN WGI Meeting #52, Feb. 2008, pp. 1-14.
"Comparison of HS-based E-RACH resource assignment", NEC, R1-080237, 3GPP TSG-RAN WGI Meeting #52, Jan. 2008, pp. 1-5.
"Two Candidate E-DCH Resource Allocation Schemes in Cell-FACH", Qualcomm Europe, R1-080421, 3GPPTSG-RAN WGI Meeting #52 , Jan. 2008, pp. 1-7.

(Continued)

*Primary Examiner* — Andrew Lee
(74) *Attorney, Agent, or Firm* — Sughrue Mion, PLLC

(57) ABSTRACT

It is possible to solve the problem that a downstream control information amount is significantly increased if allocation information is periodically reported because no allocation method of a default E-DCH resource configuration is defined for a preamble signature. A base station and a mobile station decide a default resource configuration by using a total number of resource configurations or a value obtained from the total number.

32 Claims, 11 Drawing Sheets

(56) References Cited

OTHER PUBLICATIONS

3rd Generation Partnership Project; Technical Specification Group Radio Access Network; Physical layer procedures, 3GPP TS 25.214, V7.5.0, May 2007, pp. 1-3.

3rd Generation Partnership Project; Technical Specification Group Radio Access Network; Medium Access Control (MAC) protocol specification (Release 7), 3GPP TS 25.321, V7.2.0, Sep. 2006, pp. 1-5.

Open loop power control, 3GPP TS 25.331, V7.3.0, Dec. 2006, pp. 1-11.

3rd Generation Partnership Project; Technical Specification Group Radio Access Network; Physical Channels and mapping of transport channels onto physical channels (FDD) (Release 7), 3GPP TS 25.211, V7.2.0, May 2007, pp. 1-53.

"Enhanced Uplink for Cell_FACH State in FDD", Riga, Latvia, RP-070677, TSG-RAN #37 Meeting, Sep. 2007, pp. 1-4.

3rd Generation Partnership Project; Technical Specification Group Radio Access Network; Enhanced uplink; Overall description; Stage 2 (Release 7), 3GPP TS 25.319, V7.3.0, Sep. 2007, pp. 1-44.

"Introduction of E-AICH for the purpose of E-DCH Resource Configuration Allocation", Qualcomm Europe, Ericsson, Huawei, Motorola, NEC, Nokia Siemens Networks, NXP, Philips, 3GPP TSG-RAN WG1 Meeting #52, Sorrento, Italy, Feb. 2008, pp. 1-7.

* cited by examiner

COMMUNICATION SYSTEM, MOBILE STATION, BASE STATION, RESPONSE DECISION METHOD, RESOURCE CONFIGURATION DECISION METHOD, AND PROGRAM

TECHNICAL FIELD

The present invention relates to an uplink data channel resource allocation method and related techniques.

BACKGROUND ART

In W-CDMA (Wideband Code Division Multiple Access), which is a third-generation mobile communications system, a mobile station (UE: user equipment) in a CELL_FACH (Forward Access Channel) state has no specific base station to which it is subordinate, and selects a base station each time the mobile station transmits control information or the like. The operation of RACH (Random Access Channel), which is an uplink data channel, is stipulated in a specification of the standardization project, 3GPP ($3^{rd}$ Generation Partnership Project), for third-generation mobile communications systems (see Non-patent Documents 1 through 4, for example). Moreover, in 3GPP Release 8, a technique for enhancing RACH, E-RACH (Enhanced RACH), is being studied (see Non-patent Document 5, for example). An operation of E-RACH will be briefly described with reference to FIGS. 1 through 3 hereinbelow.

FIG. 1 is a block diagram showing a configuration of a mobile communications system. For preventing complexity of explanation here, it is assumed that a plurality of mobile stations 20-1, 20-2, 20-3, ..., 20-N are located in a cell 40 of a base station 10, and the mobile stations are in a CELL_FACH state. The base station 10 is assumed to be connected to an upper network apparatus 30. It should be noted that for designating an arbitrary mobile station, it will be designated as "mobile station 20" hereinbelow.

FIG. 2 is a channel schematic diagram showing a relationship in E-RACH between a preamble, AICH or AICH and E-AICH (which will be designated as AICH/E-AICH hereinbelow), and E-DCH; and FIG. 3 is a sequence chart of channel settings for E-RACH and others. As shown in FIG. 2, in an uplink communication, there are an uplink data channel E-DCH (Enhanced Dedicated Channel), and a preamble for coordinating timing of transmission before transmitting E-DCH. In a downlink communication, there are a downlink channel AICH (Acquisition Indicator Channel) for responding to the preamble received from the mobile station, and E-AICH (Extended AICH) for allocating an E-DCH resource configuration, where AICH and E-AICH are transmitted with the same channelization code for each cell. It should be noted that some base stations do not support E-AICH. In a case that a base station does not support E-AICH and transmission with a default E-DCH resource configuration cannot be achieved, a mobile station performs transmission of the preamble again after a predetermined period of time. As used herein, the term 'default' refers to an E-DCH resource configuration index corresponding to a preamble signature.

The preamble employs a preamble signature Csig,s, and a spread code referred to as preamble scrambling code Sr-pre,n, which will be described below. The preamble signature Csig,s is composed of 4096 chips in which an Hadamard code having a code length of sixteen is repeated 256 times, and the preamble scrambling code Sr-pre,n is a cell identification code emitted by a base station. A preamble signature Csig,s is randomly selected by each mobile station from predetermined preamble signatures (Csig,1, Csig,2, ..., Csig,s), where n designates the index of a scrambling code.

A k-th value of preamble code data Cpre,n,s is constructed from a corresponding k-th preamble signature Csig,s from among 4096 chips and a corresponding preamble scrambling code Sr-pre,n, and is given by EQ. (1) as follows:

[Equation 1]

$$C_{pre,n,s}(k) = S_{r\text{-}pre,n}(k) \times C_{sig,s}(k) \times e^{j(\frac{\pi}{4}+\frac{\pi}{2}k)} \quad (1)$$

where
k=0, 1, 2, 3, ..., 4095,
Cpre,n,s: preamble code data,
Sr-pre,n: a preamble scrambling code, and
Csig,s: a preamble signature.

An uplink data channel E-DCH is composed based on a specification stipulated in 3GPP Release 6 (see Non-patent Document 6, for example).

An overview of the operation of E-RACH is shown in FIGS. 2 and 3. The base station 10 periodically broadcasts an E-DCH resource configuration list including an E-DCH resource configuration for use in E-RACH and a corresponding E-DCH resource configuration index, a preamble signature list including preamble signature numbers available in E-RACH, and the aforementioned preamble scrambling code, to mobile stations within the cell using BCH (Broadcast Channel).

The E-DCH resource configuration is comprised of E-RNTI (Enhanced Radio Network Temporary Identity), E-AICH Configuration Flag, Uplink DPCH (Dedicated Physical Channel) Info, E-DCH Info, E-AGCH (E-DCH Absolute Grant Channel) Info, E-RGCH (E-DCH Relative Grant Channel) Info, E-HICH (E-DCH Hybrid ARQ indicator Channel) Info, Downlink F-DPCH Info, TTI, E-DCH Start Time, and the like.

The mobile station 20 transmits preamble code data to the base station with an initial transmit power value calculated from the amount of receive power in a pilot channel of the base station 10. The preamble code data is generated using the preamble scrambling code emitted by the base station 10 and a preamble signature randomly selected by the mobile station. The base station 10 transmits a responsive notification (ACK/NACK) for the received preamble using the AICH signature state to the mobile station 20. In a case that the mobile station cannot use the default E-DCH resource configuration because, for example, another mobile station uses it, the base station 10 that supports E-AICH sends a responsive notification using AICH, and information representing the E-DCH resource configuration to the mobile station using E-AICH.

For example, in a case that the base station 10 has successfully received the preamble transmitted by the mobile station, and allows uplink data to be transmitted using a default E-DCH resource configuration allocated for each preamble signature contained in the preamble, the base station 10 sends a responsive notification ACK using AICH.

On the other hand, in a case that the base station 10 does not allow uplink data to be transmitted using the default E-DCH resource configuration, it sends a responsive notification NACK using AICH. Moreover, for a base station that supports E-AICH, in a case that the base station does not allow uplink data to be transmitted using the default E-DCH resource configuration but allows the uplink data to be transmitted using a non-default E-DCH resource configuration, it sends an offset value indicating an E-DCH resource configuration index allowed to be used to the mobile station using E-AICH according to a method which will be described later.

In a case that uplink data is not allowed to be transmitted even using a non-default E-DCH resource configuration, the base station sends a responsive notification NACK using AICH to the mobile station. Information indicating whether or not the base station supports E-AICH is broadcast to mobile stations within the cell using E-AICH Configuration Flag included in BCH.

In a case that the mobile station 20 has received a responsive notification using AICH, and the response for the preamble signature used in transmission of the preamble is ACK, the mobile station 20 determines an E-DCH transmission profile from a default E-DCH resource configuration allocated to the transmitted preamble signature and the initial transmit power value for the E-DCH calculated from the transmit power value for the transmitted preamble, and transmits the data to the base station 10.

The mobile station can know whether the base station supports E-AICH from E-AICH Configuration Flag mentioned above. In a case that the base station supports E-AICH, and a response to the preamble signature used in transmission of the preamble is NACK, the mobile station receives E-AICH. On the other hand, in a case that the base station does not support E-AICH, and a response to the preamble signature used in transmission of the preamble is NACK, the mobile station transmits the preamble again after a predetermined period of time. In a case that no response to the preamble signature used in transmission of the preamble is received, the mobile station 20 decides that the preamble transmitted before is not received by the base station 10, and unless the upper limit of the number of retransmissions is reached, it retransmits the preamble with a transmit power increased by a predetermined amount. In a case that E-AICH is received and the responsive notification for E-AICH is not NACK, an E-DCH transmission profile is determined from an E-DCH resource configuration corresponding to an offset value obtained from the E-AICH signature number and the E-AICH signature state included in E-AICH, and the data is transmitted to the base station 10. In a case that the responsive notification is NACK, transmission of the preamble is performed again after a predetermined period of time.

It should be noted that, as shown in FIG. 2, a minimum preamble retransmission interval τp-p,min, and an interval τp-a from a preamble to transmission of a responsive notification in AICH are predetermined. For a preamble signature corresponding to a preamble that cannot be recognized by the base station because, for example, the preamble cannot be received at the base station although it was transmitted by the mobile station, no response is made from the base station to the mobile station. In a case that no response is made until τp-a, the mobile station retransmits the preamble.

AICH transmits a responsive notification (ACK/NACK) using the AICH signature state corresponding to the preamble signature $C_{sig,s}$ of the preamble. AICH is composed by combining 32 codes 'aj' derived from EQ. (2) below, and the signature pattern $b_{s,j}$ for AICH is defined in Table 1 (see Non-patent Document 4, for example), where s designates an AICH signature number, and $b_{s,j}$ may take sixteen patterns. Moreover, AIs indicates the AICH signature state, which takes AIs=+1 when the responsive notification for AICH is ACK, or AIs=−1 when it is NACK.

[Equation 2]

$$a_j = \sum_{s=0}^{15} AI_s b_{s,j} \quad (2)$$

TABLE 1

| s | $b_{s,0}, b_{s,1} \ldots, b_{s,31}$ | | | | | | | | | | | | | | | |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | 1 | −1 | −1 | 1 | 1 | −1 | −1 | 1 | 1 | −1 | −1 | 1 | 1 | −1 | −1 |
| 2 | 1 | 1 | 1 | 1 | −1 | −1 | −1 | −1 | 1 | 1 | 1 | 1 | −1 | −1 | −1 | −1 |
| 3 | 1 | 1 | −1 | −1 | −1 | −1 | 1 | 1 | 1 | 1 | −1 | −1 | −1 | −1 | 1 | 1 |
| 4 | 1 | 1 | 1 | 1 | 1 | 1 | 1 | 1 | −1 | −1 | −1 | −1 | −1 | −1 | −1 | −1 |
| 5 | 1 | 1 | −1 | −1 | 1 | 1 | −1 | −1 | −1 | −1 | 1 | 1 | −1 | −1 | 1 | 1 |
| 6 | 1 | 1 | 1 | 1 | −1 | −1 | −1 | −1 | −1 | −1 | −1 | −1 | 1 | 1 | 1 | 1 |
| 7 | 1 | 1 | −1 | −1 | −1 | −1 | 1 | 1 | −1 | −1 | 1 | 1 | 1 | 1 | −1 | −1 |
| 8 | 1 | 1 | 1 | 1 | 1 | 1 | 1 | 1 | 1 | 1 | 1 | 1 | 1 | 1 | −1 | −1 |
| 9 | 1 | 1 | −1 | −1 | 1 | 1 | −1 | −1 | 1 | 1 | −1 | −1 | 1 | 1 | −1 | −1 |
| 10 | 1 | 1 | 1 | 1 | −1 | −1 | −1 | −1 | 1 | 1 | 1 | 1 | −1 | −1 | −1 | −1 |
| 11 | 1 | 1 | −1 | −1 | −1 | −1 | 1 | 1 | 1 | 1 | −1 | −1 | −1 | −1 | 1 | 1 |
| 12 | 1 | 1 | 1 | 1 | 1 | 1 | 1 | 1 | −1 | −1 | −1 | −1 | −1 | −1 | −1 | −1 |
| 13 | 1 | 1 | −1 | −1 | 1 | 1 | −1 | −1 | −1 | −1 | 1 | 1 | −1 | −1 | 1 | 1 |
| 14 | 1 | 1 | 1 | 1 | −1 | −1 | −1 | −1 | −1 | −1 | −1 | −1 | 1 | 1 | 1 | 1 |
| 15 | 1 | 1 | −1 | −1 | −1 | −1 | 1 | 1 | −1 | −1 | 1 | 1 | 1 | 1 | −1 | −1 |

| s | $b_{s,0}, b_{s,1} \ldots, b_{s,31}$ | | | | | | | | | | | | | |
|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 |
| 1 | −1 | −1 | 1 | 1 | −1 | −1 | 1 | 1 | −1 | −1 | 1 | 1 | −1 | −1 |
| 2 | 1 | 1 | −1 | −1 | −1 | −1 | 1 | 1 | 1 | 1 | −1 | −1 | −1 | −1 |
| 3 | −1 | −1 | −1 | −1 | 1 | 1 | 1 | 1 | −1 | −1 | −1 | −1 | 1 | 1 |
| 4 | 1 | 1 | 1 | 1 | 1 | 1 | −1 | −1 | −1 | −1 | −1 | −1 | −1 | −1 |
| 5 | −1 | −1 | 1 | 1 | −1 | −1 | −1 | −1 | 1 | 1 | −1 | −1 | 1 | 1 |
| 6 | 1 | 1 | −1 | −1 | −1 | −1 | −1 | −1 | −1 | −1 | 1 | 1 | 1 | 1 |
| 7 | −1 | −1 | −1 | −1 | 1 | 1 | −1 | −1 | 1 | 1 | 1 | 1 | −1 | −1 |
| 8 | −1 | −1 | −1 | −1 | −1 | −1 | −1 | −1 | −1 | −1 | −1 | −1 | −1 | −1 |
| 9 | 1 | 1 | −1 | −1 | 1 | 1 | −1 | −1 | 1 | 1 | −1 | −1 | 1 | 1 |
| 10 | −1 | −1 | 1 | 1 | 1 | 1 | −1 | −1 | −1 | −1 | 1 | 1 | 1 | 1 |
| 11 | 1 | 1 | 1 | 1 | −1 | −1 | −1 | −1 | 1 | 1 | 1 | 1 | −1 | −1 |

TABLE 1-continued

| | | | | | | | | | | | | | | | |
|---|---|---|---|---|---|---|---|---|---|---|---|---|---|---|---|
| 12 | −1 | −1 | −1 | −1 | −1 | −1 | 1 | 1 | 1 | 1 | 1 | 1 | 1 | 1 |
| 13 | 1 | 1 | −1 | −1 | 1 | 1 | 1 | 1 | −1 | −1 | 1 | 1 | −1 | −1 |
| 14 | −1 | −1 | 1 | 1 | 1 | 1 | 1 | 1 | 1 | 1 | −1 | −1 | −1 | −1 |
| 15 | 1 | 1 | 1 | 1 | −1 | −1 | 1 | 1 | −1 | −1 | −1 | −1 | 1 | 1 |

E-AICH is composed by combining 32 codes 'aj' derived from EQ. (3) below using the same channelization code as that for AICH. The E-AICH signature pattern cs,j is defined in Table 2 (see Non-patent Document 7, for example), where s' designates an E-AICH signature number, and cs,j may take sixteen patterns at maximum. Moreover, EAIs' designates the E-AICH signature state, and the state of only one E-AICH signature is used per access slot among one or more E-AICH signature numbers to send the offset value to the mobile station.

Table 3 is a table representing an example of correspondence between an E-AICH signature state, an E-AICH signature number, and an offset value indicating an E-DCH resource configuration index. X designates a default E-DCH resource configuration index corresponding to a preamble signature, Y designates the total number of E-DCH resource configurations. The offset value in Table 3 indicates an offset from the E-DCH resource configuration index allocated by default in the E-DCH resource configuration list. For example, when the E-AICH signature state is +1 and the E-AICH signature number is zero, the offset from the E-DCH resource configuration index allocated by default is one. When E-AICH is decoded to obtain an offset of one, the mobile station performs data transmission using an E-DCH resource configuration corresponding to the E-DCH resource configuration index obtained by adding one to the E-DCH resource configuration index allocated by default.

On receipt of E-AICH, the mobile station decodes E-AICH using the E-AICH signature pattern. Decoding of E-AICH may be achieved in a manner in which the E-AICH signature is arranged in order, such as in the order of the E-AICH signature starting from #0, for example, and the E-AICH signature is determined in partial decoding, or in a manner in which after all E-AICH signatures are decoded, an E-AICH signature estimated to have the highest probability is determined. An offset value is determined from the E-AICH signature number obtained by decoding E-AICH, and the E-AICH signature state. An E-DCH resource configuration corresponding to an E-DCH resource configuration index designated by the default E-DCH resource configuration index and obtained offset is used to determine an E-DCH transmission profile.

[Equation 3]

$$a_j = EAI_{s'} c_{s',j} \quad (3)$$

TABLE 2

| $EAI_{s'}$ | signature s' | Resource configuration index |
|---|---|---|
| +1 | 0 | NACK |
| −1 | | (X + 1) mod Y |
| +1 | 1 | (X + 2) mod Y |
| −1 | | (X + 3) mod Y |
| +1 | 2 | (X + 4) mod Y |
| −1 | | (X + 5) mod Y |
| +1 | 3 | (X + 6) mod Y |
| −1 | | (X + 7) mod Y |
| +1 | 4 | (X + 8) mod Y |
| −1 | | (X + 9) mod Y |
| +1 | 5 | (X + 10) mod Y |
| −1 | | (X + 11) mod Y |
| +1 | 6 | (X + 12) mod Y |
| −1 | | (X + 13) mod Y |
| +1 | 7 | (X + 14) mod Y |
| −1 | | (X + 15) mod Y |
| +1 | 8 | (X + 16) mod Y |
| −1 | | (X + 17) mod Y |
| +1 | 9 | (X + 18) mod Y |
| −1 | | (X + 19) mod Y |
| +1 | 10 | (X + 20) mod Y |
| −1 | | (X + 21) mod Y |
| +1 | 11 | (X + 22) mod Y |
| −1 | | (X + 23) mod Y |
| +1 | 12 | (X + 24) mod Y |
| −1 | | (X + 25) mod Y |
| +1 | 13 | (X + 26) mod Y |
| −1 | | (X + 27) mod Y |
| +1 | 14 | (X + 28) mod Y |
| −1 | | (X + 29) mod Y |
| +1 | 15 | (X + 30) mod Y |
| −1 | | (X + 31) mod Y |

TABLE 3

| s | $c_{s,0}, c_{s,1}, \ldots, c_{s,31}$ | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 0 | 1 | −1 | 1 | −1 | 1 | −1 | 1 | −1 | 1 | −1 | 1 | −1 | 1 | −1 | 1 | −1 | 1 | −1 | 1 | −1 | 1 | −1 | 1 | −1 | 1 | −1 | 1 | −1 | 1 | −1 | 1 | −1 |
| 1 | 1 | 1 | −1 | −1 | 1 | 1 | −1 | −1 | 1 | 1 | −1 | −1 | 1 | 1 | −1 | −1 | 1 | 1 | −1 | −1 | 1 | 1 | −1 | −1 | 1 | 1 | −1 | −1 | 1 | 1 | −1 | −1 |
| 2 | 1 | −1 | 1 | −1 | −1 | 1 | −1 | 1 | 1 | −1 | 1 | −1 | −1 | 1 | −1 | 1 | 1 | −1 | 1 | −1 | −1 | 1 | −1 | 1 | 1 | −1 | 1 | −1 | −1 | 1 | −1 | 1 |
| 3 | 1 | 1 | −1 | −1 | 1 | −1 | 1 | 1 | −1 | 1 | −1 | −1 | 1 | −1 | 1 | 1 | −1 | 1 | 1 | −1 | −1 | 1 | −1 | 1 | 1 | −1 | 1 | −1 | −1 | 1 | −1 | 1 |
| 4 | 1 | −1 | 1 | −1 | 1 | −1 | 1 | −1 | −1 | 1 | −1 | 1 | −1 | 1 | −1 | 1 | 1 | −1 | 1 | −1 | 1 | −1 | 1 | −1 | −1 | 1 | −1 | 1 | −1 | 1 | 1 | −1 |
| 5 | 1 | 1 | −1 | −1 | 1 | 1 | −1 | −1 | −1 | −1 | 1 | 1 | −1 | −1 | 1 | 1 | 1 | 1 | −1 | −1 | 1 | 1 | −1 | −1 | −1 | −1 | 1 | 1 | −1 | −1 | 1 | 1 |
| 6 | 1 | −1 | 1 | −1 | −1 | 1 | −1 | 1 | −1 | 1 | −1 | 1 | 1 | −1 | 1 | −1 | 1 | −1 | 1 | −1 | −1 | 1 | −1 | 1 | −1 | 1 | −1 | 1 | 1 | −1 | 1 | −1 |
| 7 | 1 | 1 | −1 | −1 | 1 | 1 | 1 | 1 | −1 | −1 | 1 | 1 | −1 | −1 | 1 | 1 | 1 | 1 | −1 | −1 | 1 | 1 | 1 | 1 | −1 | −1 | 1 | 1 | −1 | −1 | 1 | 1 |
| 8 | 1 | −1 | 1 | −1 | 1 | −1 | 1 | −1 | 1 | −1 | 1 | −1 | 1 | −1 | 1 | −1 | −1 | 1 | −1 | 1 | −1 | 1 | −1 | 1 | −1 | 1 | −1 | 1 | −1 | 1 | −1 | 1 |
| 9 | 1 | 1 | −1 | −1 | 1 | 1 | −1 | −1 | 1 | 1 | −1 | −1 | 1 | 1 | −1 | −1 | −1 | −1 | 1 | 1 | −1 | −1 | 1 | 1 | −1 | −1 | 1 | 1 | −1 | −1 | 1 | 1 |
| 10 | 1 | −1 | 1 | −1 | −1 | 1 | −1 | 1 | 1 | −1 | 1 | −1 | −1 | 1 | −1 | 1 | −1 | 1 | −1 | 1 | 1 | −1 | 1 | −1 | −1 | 1 | −1 | 1 | 1 | −1 | 1 | −1 |
| 11 | 1 | 1 | −1 | −1 | −1 | −1 | 1 | 1 | 1 | 1 | −1 | −1 | −1 | −1 | 1 | 1 | −1 | −1 | 1 | 1 | 1 | 1 | −1 | −1 | −1 | −1 | 1 | 1 | 1 | 1 | −1 | −1 |
| 12 | 1 | −1 | 1 | −1 | 1 | −1 | 1 | −1 | −1 | 1 | −1 | 1 | −1 | 1 | −1 | 1 | −1 | 1 | −1 | 1 | −1 | 1 | −1 | 1 | 1 | −1 | 1 | −1 | 1 | −1 | 1 | −1 |
| 13 | 1 | 1 | −1 | −1 | 1 | 1 | −1 | −1 | −1 | −1 | 1 | 1 | −1 | −1 | 1 | 1 | −1 | −1 | 1 | 1 | −1 | −1 | 1 | 1 | 1 | 1 | −1 | −1 | 1 | 1 | −1 | −1 |
| 14 | 1 | −1 | 1 | −1 | −1 | 1 | −1 | 1 | −1 | 1 | −1 | 1 | 1 | −1 | 1 | −1 | −1 | 1 | −1 | 1 | 1 | −1 | 1 | −1 | 1 | −1 | 1 | −1 | −1 | 1 | −1 | 1 |

TABLE 3-continued

| 15 | 1 | -1 | -1 | 1 | -1 | 1 | 1 | -1 | -1 | 1 | 1 | -1 | 1 | -1 | -1 | 1 | -1 | 1 |

| $s$ | $c_{s,0}, c_{s,1} \ldots , c_{s,31}$ |
| --- | --- |
| 0 | 1 -1 1 -1 1 -1 1 -1 1 -1 1 -1 1 -1 1 -1 |
| 1 | -1 1 1 -1 -1 1 1 -1 -1 1 1 -1 -1 1 1 -1... 1 |
| 2 | 1 -1 -1 1 -1 1 1 -1 1 -1 -1 1 -1 1 |
| 3 | -1 1 -1 1 1 -1 1 -1 -1 1 -1 1 1 -1 1 -1... |
| 4 | 1 -1 1 -1 1 -1 -1 1 -1 1 -1 1 -1 1 |
| 5 | -1 1 1 -1 -1 1 -1 1 1 -1 -1 1 1 -1... |
| 6 | 1 -1 -1 1 -1 1 -1 1 -1 1 1 -1 1 -1... |
| 7 | -1 1 -1 1 1 -1 -1 1 1 -1 1 -1 -1 1... |
| 8 | -1 1 -1 1 -1 1 -1 1 -1 1 1 -1 1 -1... |
| 9 | 1 -1 -1 1 1 -1 -1 1 1 -1 -1 1 1 -1... |
| 10 | -1 1 1 -1 1 -1 -1 1 -1 1 1 -1 1 -1... |
| 11 | 1 -1 1 -1 -1 1 -1 1 1 -1 1 -1 -1 1... |
| 12 | -1 -1 1 -1 1 -1 1 1 -1 1 -1 1 -1 1 1 -1 |
| 13 | 1 -1 -1 1 1 -1 1 -1 -1 1 1 -1 -1 1... |
| 14 | -1 1 1 -1 1 -1 1 -1 1 -1 -1 1 -1 1... |
| 15 | 1 -1 1 -1 -1 1 1 -1 -1 1 -1 1 1 -1 |

Non-patent Document 1: 3GPP TS25.214 v7.5.0, May 2007
Non-patent Document 2: 3GPP TS25.321 v7.2.0, September 2006
Non-patent Document 3: 3GPP TS25.331 v7.3.0, December 2006
Non-patent Document 4: 3GPP TS25.211 v7.2.0, May 2007
Non-patent Document 5: 3GPP RP-070677, Nokia Siemens Networks, Nokia, Ericsson, Qualcomm, T-Mobile, Telecom Italia, "Enhanced Uplink for CELL_FACH State in FDD," September 2007
Non-patent Document 6: 3GPP TS25.319 v7.3.0
Non-patent Document 7: 3GPP R1-080835, Qualcomm Europe, Ericsson, Huawei, Motorola, NEC, Nokia, Nokia Siemens Networks, NXP, Philips, 25.211 CR DRFT, 2008.02.15

DISCLOSURE OF THE INVENTION

Problems to be Solved by the Invention

The E-RACH system proposed by Non-patent Document 7 may be incorrectly operated because a method of allocation of a default E-DCH resource configuration for a preamble signature in the E-DCH resource configuration list is not defined. Common methods for solving the problem that may be contemplated include a method of broadcasting from a base station a default E-DCH resource configuration index to be allocated for each preamble signature using BCH; however, the method uses four bits to specify sixteen preamble signature numbers at maximum, and five bits to specify thirty-one E-DCH resource configuration indices at maximum, which requires 144 bits at maximum to allocate default E-DCH resource configurations to all preamble signatures, resulting in a problem that the amount of downlink control information is significantly increased by periodically broadcasting the allocation information using BCH.

It is therefore an object of the present invention to provide a default resource configuration allocation method and apparatus that can prevent an increase of the amount of broadcast information.

Means For Solving the Problems

The present invention for solving the aforementioned problems is a communications system comprised of a base station and mobile stations, characterized in that the base station receives a preamble transmitted by the mobile station, and transmits a response to the received preamble to the mobile station, and in a case that the response is a first response, the mobile station transmits data using information about at least a part of a default resource configuration of the own mobile station that is determined using the total number of resource configurations or a value obtained from the total number.

The present invention for solving the aforementioned problems is a base station, characterized in that the base station determines a responsive notification in response to a preamble transmitted by a mobile station based on a default resource configuration determined using the total number of resource configurations or a value obtained from the total number.

The present invention for solving the aforementioned problems is a mobile station for transmitting a preamble to a base station, characterized in that the mobile station receives a response to the preamble from the base station, and in a case that the response is a first response, the mobile station transmits data using information about at least a part of a resource configuration that is determined as a default resource configuration of the own mobile station using the total number of resource configurations or a value obtained from the total number.

The present invention for solving the aforementioned problems is a response determination method for a base station, characterized in comprising determining a responsive notification in response to a preamble transmitted by a mobile station based on a default resource configuration determined using the total number of resource configurations or a value obtained from the total number.

The present invention for solving the aforementioned problems is a resource configuration determination method for a mobile station, characterized in comprising determining a default resource configuration using the total number of resource configurations or a value obtained from the total number.

The present invention for solving the aforementioned problems is a program for causing an information processing apparatus to execute processing, the program being characterized in causing the information processing apparatus to execute processing of determining a responsive notification to be transmitted by a base station in response to a preamble transmitted by a mobile station based on a default resource configuration determined using the total number of resource configurations or a value obtained from the total number.

The present invention for solving the aforementioned problems is a program for causing an information processing apparatus to execute processing, the program being characterized in causing the information processing apparatus to execute processing of determining a default resource configuration in a mobile station using the total number of resource configurations or a value obtained from the total number.

Effects of the Invention

According to the present invention, a default resource configuration can be allocated while preventing an increase of the amount of broadcast information.

EXPLANATION OF SYMBOLS

Figure 1:
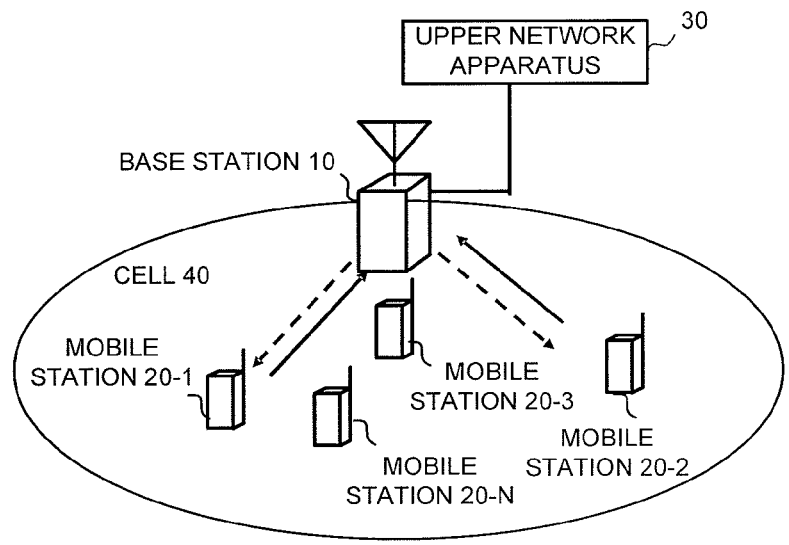
FIG. 1 A block diagram showing a configuration of a mobile communications system.
Figure 2:
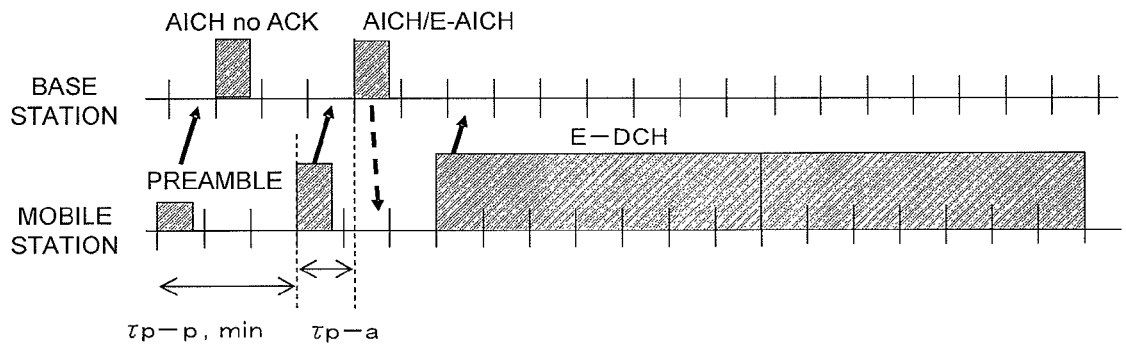
FIG. 2 A channel schematic diagram showing a relationship between E-RACH, AICH/E-AICH, and E-DCH.
Figure 3:
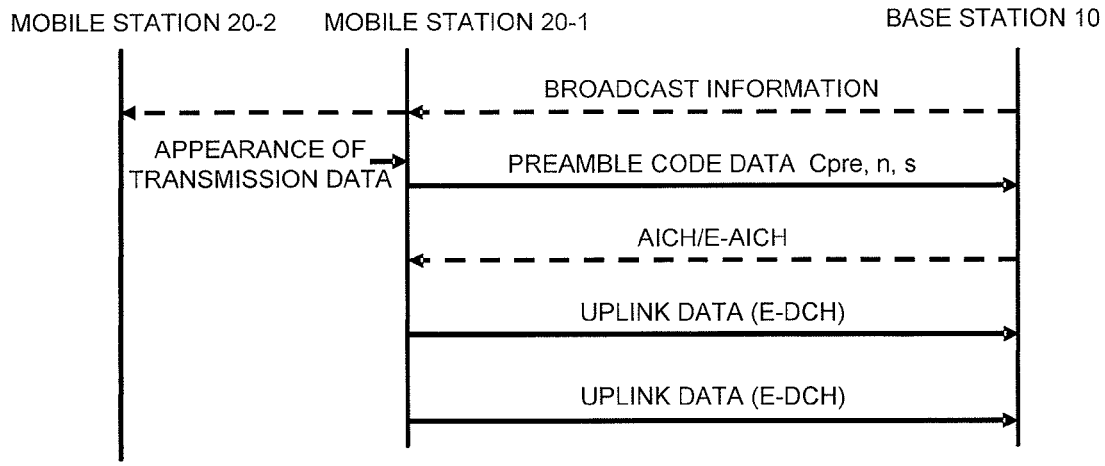
FIG. 3 A sequence chart of channel settings for E-RACH and others.

10 Base station
20 Mobile station
101 Wireless communication section
102 Uplink signal reception processing section
103 Uplink signal transmission processing section
104 Communication section
105 Downlink signal reception processing section
106 Downlink signal transmission processing section
107 Resource configuration generating section
108 Preamble identifying section
109 Resource configuration control section
201 Wireless communication section
202 Reception processing section
203 Responsive notification processing section
204 Transmission data control section
205 Resource configuration keeping section
206 Transmission processing section
207 Buffer

BEST MODES FOR CARRYING OUT THE INVENTION

The present invention is characterized in determining a default resource configuration using at least the total number of resource configurations or a value obtained from the total number.

Now configurations of a base station and a mobile station will be described below with reference to FIGS. 4 and 5, assuming that the resource configuration is an E-DCH resource configuration.

Figure 4:
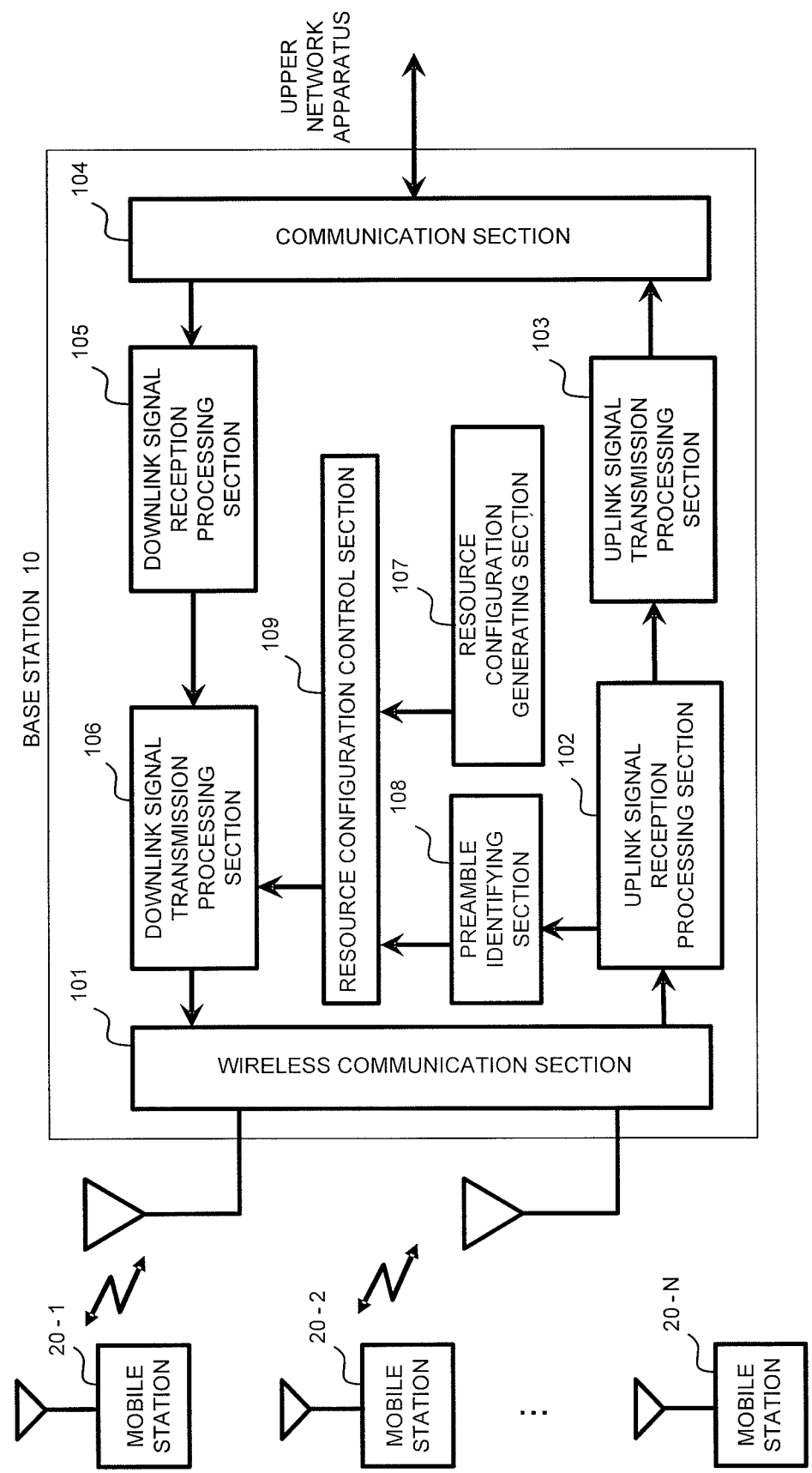
FIG. 4 A block diagram showing an example of a configuration of a base station in a wireless communications system according to the present invention.

FIG. 4 is a block diagram showing an example of a configuration of a base station in first through third embodiments. A base station 10 is provided with a wireless communication section 101 for wireless communication with mobile stations 20, an uplink signal reception processing section 102 for processing uplink signals received from the mobile stations, an uplink signal transmission processing section 103 for performing processing for transmitting data within the uplink signals to be transferred to an upper network apparatus, such as, for example, a base station control apparatus, and a communication section 104 for transmitting the data to the upper network apparatus. Data from the upper network apparatus is received at the communication section 104, and then, a downlink signal reception processing section 105 applies processing. The processing for transmitting downlink signals to the mobile stations is performed at a downlink signal transmission processing section 106, and the signals are transmitted to a destination mobile station from the wireless communication section 101.

The base station 10 is also provided with a preamble identifying section 108 connected to the uplink signal reception processing section 102, a resource configuration generating section 107, and a resource configuration control section 109. In a case that a preamble is received from a mobile station, the uplink signal reception processing section 102 transfers it to the preamble identifying section 108; otherwise, to the uplink signal transmission processing section 103. The preamble identifying section 108 identifies a preamble signature from the preamble transferred from the uplink signal reception processing section 102, and sends its content to the resource configuration control section 109.

The resource configuration generating section 107 generates an E-DCH resource configuration list in which an E-DCH resource configuration is correlated with an E-DCH resource configuration index for use in E-RACH for each predetermined period of time, and outputs the list to the resource configuration control section 109. While the E-DCH resource configuration list is described as being generated and output for each predetermined period of time, a mode in which the information is predetermined may be contemplated.

The resource configuration control section 109 keeps the E-DCH resource configuration list transferred from the resource configuration generating section 107, and a preamble signature list containing prespecified information about preamble signatures available for E-RACH. The resource configuration control section 109 outputs the E-DCH resource configuration list and preamble signature list to the downlink signal transmission processing section 106, which in turn broadcasts the E-DCH resource configuration list received from the transmission processing section 106 to the mobile stations within the cell via the wireless communication section 101.

Moreover, when a result of identification of a preamble is transferred from the preamble identifying section 108, and in a case that a default E-DCH resource configuration corresponding to the preamble signature identified at the preamble identifying section 108 is available in the kept E-DCH resource configuration list, the resource configuration control section 109 transmits a responsive notification ACK to the transmission processing section 106 using AICH. In a case that the default E-DCH resource configuration is not available, and a non-default E-DCH resource configuration is available in the E-DCH resource configuration list, an available E-DCH resource configuration is selected from the E-DCH resource configuration list. Furthermore, a responsive notification NACK using AICH, and an E-AICH signature that is determined from an offset value between the default E-DCH resource configuration and the selected E-DCH resource configuration, and an E-AICH signature state using E-AICH are transmitted to the transmission processing section 106.

In a case that the default E-DCH resource configuration is not available, and no E-DCH resource configuration is available in the E-DCH resource configuration list, NACK using AICH and NACK using E-AICH are transmitted to the transmission processing section 106. The transmission processing section 106 uses AICH to transmit a responsive notification in response to the preamble transferred from the resource configuration control section 109, and incorporates the E-AICH signature state into E-AICH and uses an E-AICH signature pattern corresponding to the E-AICH signature to transmit information about the E-DCH resource configuration to the mobile station via the wireless communication section 101.

While the E-DCH resource configuration list is described here as being kept in the resource configuration control section 109, a mode in which the list is kept in the resource configuration generating section 107 may be contemplated, or another storage may be provided for keeping it. This requires an operation of sending the E-DCH resource configuration list from the E-DCH resource configuration generating section 107 to the resource configuration control section 109, or an operation of loading it from the resource configuration generating section 107 or storage by the resource configuration control section 109.

It should be noted that functions equivalent to those of the preamble identifying section 108, resource configuration generating section 107 and resource configuration control section 109 may be implemented by running programs of respective corresponding functions on a program-controlled processor such as a CPU. Moreover, the drawings here show portions relating to the channel allocation method according to the present invention, and other portions in the configuration are omitted.

Figure 5:
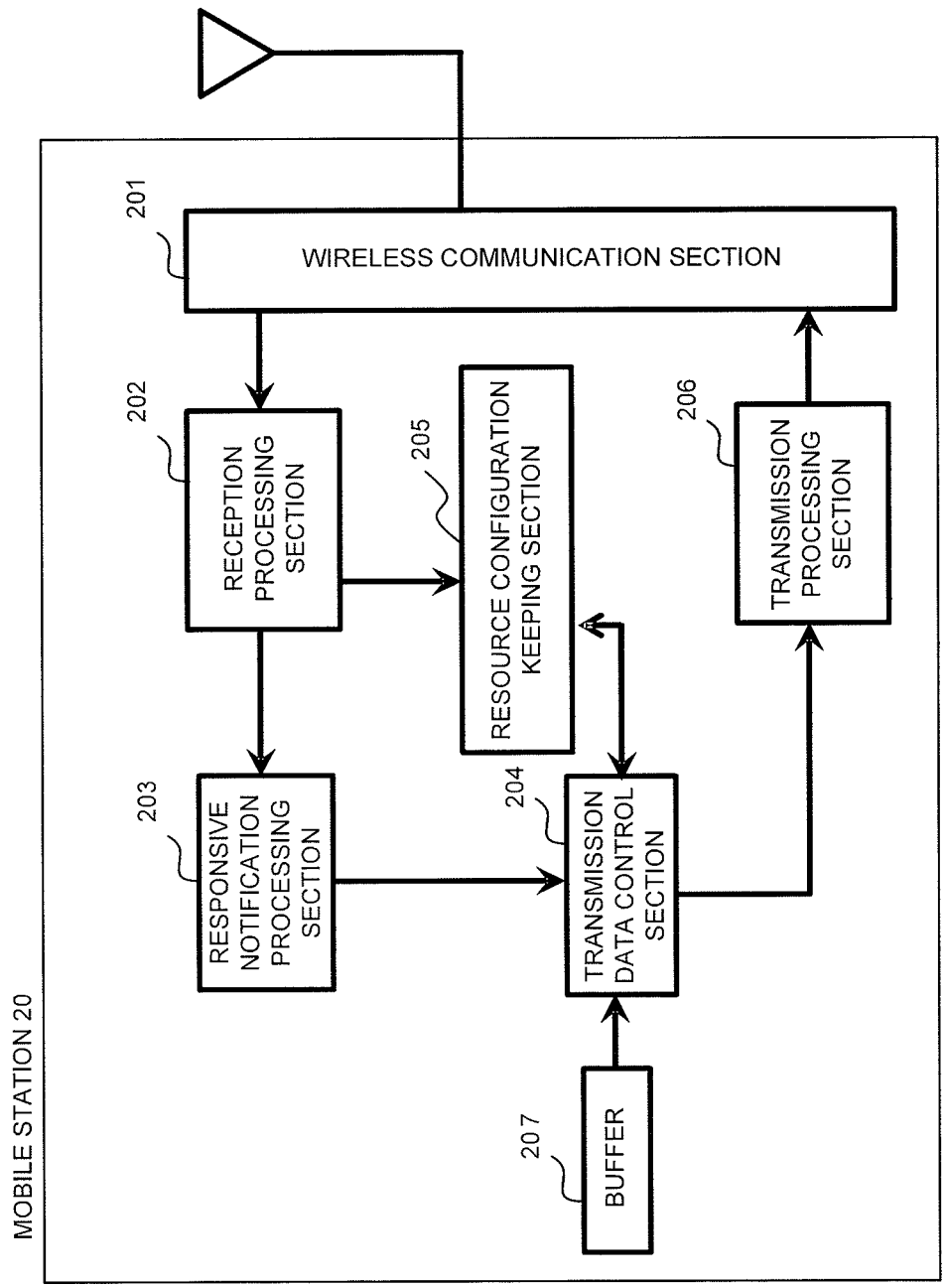
FIG. 5 A block diagram showing an example of a configuration of a mobile station in the wireless communications system according to the present invention.

FIG. 5 is a block diagram showing an example of a configuration of a mobile station in the first through third embodiments. A mobile station 20 comprises a wireless communication section 201 for wireless communication with a base station, a reception processing section 202, a responsive notification processing section 203, a transmission data control section 204, a resource configuration keeping section 205, a transmission processing section 206, and a buffer 207. Again, the drawing shows portions relating to the channel allocation method according to the present invention, and other portions in the configuration are omitted.

The reception processing section 202 receives data from a base station via the wireless communication section 201, and in a case that the data is a responsive notification in response to a preamble, it transfers the data to the responsive notification processing section 203; or in a case that the data is an E-DCH resource configuration list, it transfers the list to the resource configuration keeping section 205. The resource configuration keeping section 205 keeps the transferred E-DCH resource configuration list. The responsive notification processing section 203 extracts the responsive notification for AICH in response to the preamble supplied via the reception processing section 202, and in a case that the responsive notification using AICH is NACK, an offset value obtained from the E-AICH signature decoded using the E-AICH signature pattern and the E-AICH signature state contained in E-AICH. The responsive notifications for AICH and E-AICH are transferred to the transmission data control section 204. While the E-DCH resource configuration list is described as being received, a mode in which the information is kept in mobile stations beforehand may be contemplated.

The transmission data control section 204 invokes the E-DCH resource configuration list kept in the resource configuration keeping section 205, determines an E-DCH resource configuration for use in E-RACH from the responsive notifications for AICH and E-AICH supplied via the responsive notification processing section 203 and the invoked E-DCH resource configuration list, and outputs it to the transmission processing section 206. The transmission processing section 206 configures an E-DCH transmission profile based on the E-DCH resource configuration supplied as input from the transmission data control section 204, and transmits the data to the base station via the wireless communication section 201.

While the kept E-DCH resource configuration list is described here as being kept in the resource configuration keeping section 205, a mode in which the list is transmitted directly from the reception processing section 202 or via the resource configuration keeping section 205 to the transmission data control section 204 for keeping the list therein may be contemplated. This eliminates the need for processing of loading the E-DCH resource configuration list from the resource configuration keeping section 205 via the transmission data control section 204.

The buffer 207 keeps data to be transmitted when it appears. It also passes the kept data to the transmission data control section when transmission processing is performed.

It should be noted that functions equivalent to those of the responsive notification processing section 203 and transmission data control section 204 may be implemented by running programs of respective corresponding functions on a program-controlled processor such as a CPU.

First Embodiment

This embodiment is characterized in determining a default resource configuration from the preamble signature number, and the total number of resource configurations or a value obtained from that total number.

Now an exemplary wireless communications system for data transmission/reception will be described with reference to FIGS. 6-10, in which the resource configuration is an E-DCH resource configuration, and the total number of E-DCH resource configurations is directly used to calculate an E-DCH resource configuration index to be allocated by default from the broadcast preamble signature list, E-DCH resource configuration list, and the remainder of the preamble signature number divided by the total number of E-DCH resource configurations.

Figure 6:
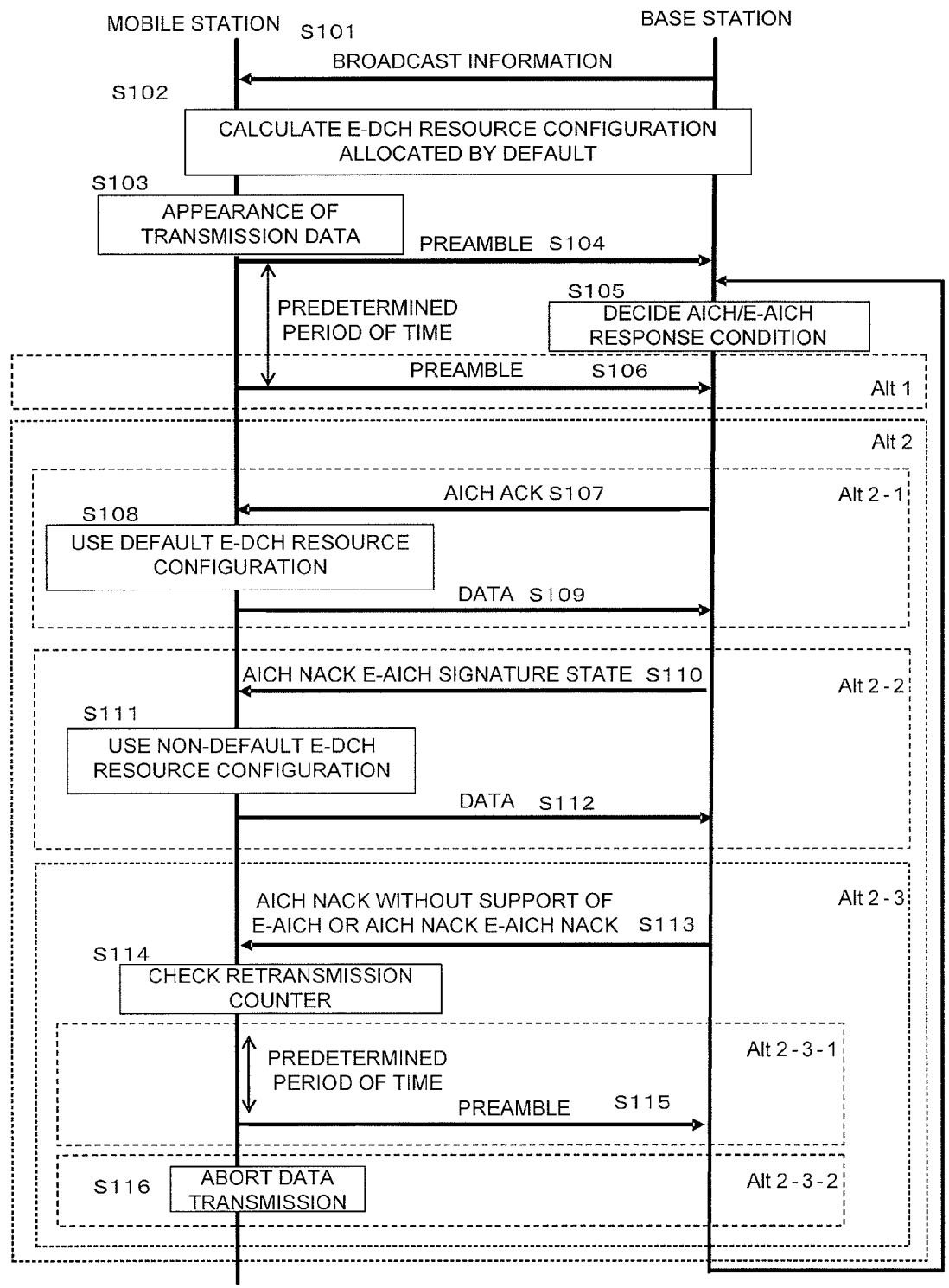
FIG. 6 A sequence chart showing a procedure of data transmission in first and second embodiments of the present invention.

FIG. 6 is a sequence chart showing a procedure of data transmission in this embodiment. A base station broadcasts an E-DCH resource configuration list and a preamble signature list using BCH to mobile stations within a cell for each predetermined period of time (Step S101). The resource configuration keeping section 205 in a mobile station keeps the received broadcast information, and when it has received new broadcast information, it updates the information. At that time, the mobile station and base station individually calculate an E-DCH resource configuration index to be allocated by default from the remainder of the preamble signature number divided by the total number of E-DCH resource configurations from the broadcast information based on EQ. (4) below (Step S102):

[Equation 4]

$$D\text{ind} = P\text{reind} \bmod Y \qquad (4)$$

where Dind designates an E-DCH resource configuration index to be allocated by default, Preind designates a preamble signature number, and Y designates the total number of E-DCH resource configurations.

Once transmission data has appeared in the buffer 207 in the mobile station (Step S103), the mobile station, particularly, the transmission data control section 204, transmits a preamble to the base station as described above (Step S104). Upon receipt of the preamble, the base station performs processing of an AICH/E-AICH response condition decision step for deciding whether the default E-DCH resource configuration corresponding to a received preamble signature is available (Step S105). The AICH/E-AICH response condition decision step calculates a default E-DCH resource configuration corresponding to the received preamble signature using EQ. (4) given above.

Once the base station has received a preamble, processing according to one of Alt 2-1, 2-2, 2-3 is performed depending upon the decision at the AICH/E-AICH response condition decision step. In a case that the base station cannot recognize a preamble because, for example, the preamble cannot be received at the base station although it was transmitted by the mobile station, the base station makes no special notification to the mobile station, and waits for any action from the mobile station in Alt 1. In Alt 1, the mobile station retransmits the preamble after a predetermined period of time from the transmission of the preamble at Step S104 (Step S106), and the base station performs processing at the AICH/E-AICH response condition decision step again.

In a case that the calculated E-DCH resource configuration is available at the AICH/E-AICH response condition decision step, processing in Alt 2-1 is performed. In Alt 2-1, a responsive notification ACK is transmitted to the mobile station using AICH (Step S107), and the mobile station determines an E-DCH transmission profile from the default E-DCH resource configuration calculated using EQ. (4) given earlier (Step S108), and transmits uplink data (Step S109).

In a case that in the AICH/E-AICH response condition decision step, the default E-DCH resource configuration is not available, and a non-default E-DCH configuration is available in the E-DCH resource configuration list, processing in Alt 2-2 is performed. In Alt 2-2, a responsive notification NACK using AICH and a state including an E-AICH signature state using E-AICH are transmitted to the mobile station. In transmitting the information, an E-AICH signature pattern corresponding to an E-AICH signature obtained from an offset value between the default E-DCH resource configuration and the selected E-DCH resource configuration is used (Step S110).

The mobile station uses the E-AICH signature pattern to decode E-AICH. The resulting E-AICH signature and E-AICH signature state from decoding are used in combination to extract an offset value. Moreover, an E-DCH resource configuration for use in transmission is determined from the extracted offset value and the default E-DCH resource configuration. An E-DCH transmission profile is determined from the determined E-DCH resource configuration (Step S111), and uplink data is transmitted (Step S112).

In a case that in the AICH/E-AICH response condition decision step, no E-DCH resource configuration is available or the default E-DCH resource configuration cannot be used in a base station that does not support E-AICH, processing in Alt 2-3 is performed. In Alt 2-3, a responsive notification NACK is transmitted to the mobile station using AICH for a base station that does not support E-AICH, and a responsive notification NACK is transmitted there using AICH and E-AICH for a base station that supports E-AICH (Step S113). Thereafter, the mobile station checks a retransmission counter (Step S114). In a case that the remaining count in the retransmission counter is non-zero, the processing in Alt 2-3-1 of retransmitting the preamble after a predetermined wait time is performed (Step S115); or in a case that the remaining count in the retransmission counter is zero, the processing at Alt 2-3-2 of aborting data transmission is performed (Step S116).

Now Step 102 of calculating a default E-DCH resource configuration index will be described with reference to FIGS. 7 and 8.

Figure 7:
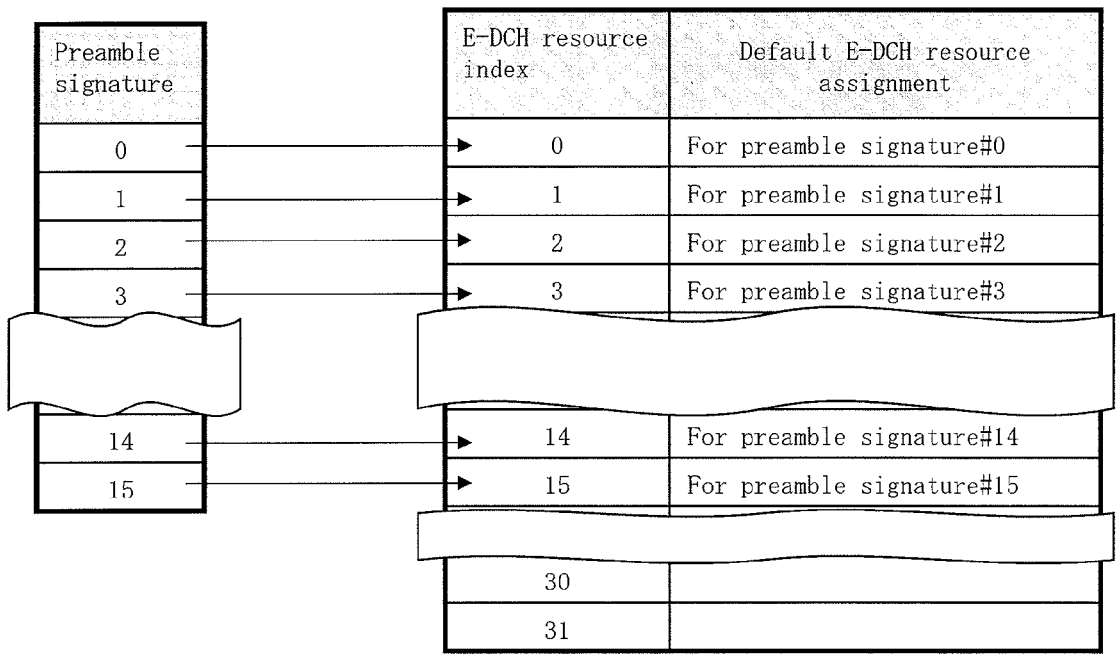
FIG. 7 A first schematic diagram of allocation of a default E-DCH resource configuration in the first embodiment of the present invention.

FIG. 7 shows an example of correspondence between a preamble signature number and an E-DCH resource configuration index in a case that the number of E-DCH resource configurations is greater than the number of preamble signatures. In this case, the E-DCH resource configuration index allocated by default matches the preamble signature number. It should be noted that in a case that the number of preamble signatures is equal to the number of E-DCH resource configurations, the E-DCH resource configuration index matches the preamble signature number as with FIG. 7.

Figure 8:
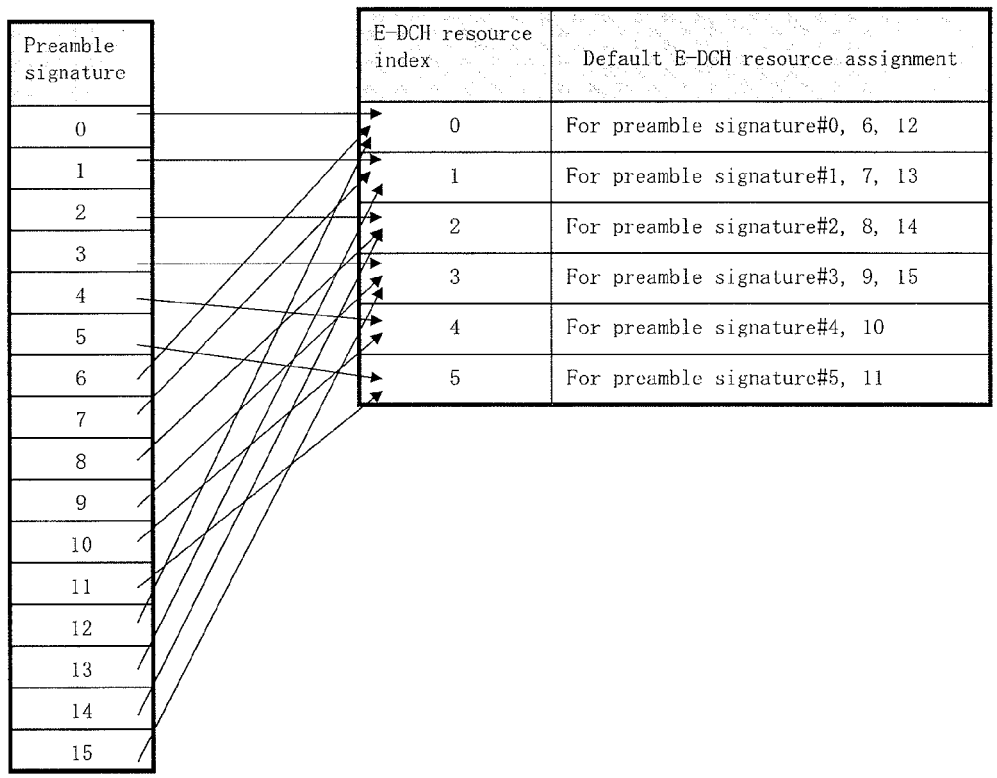
FIG. 8 A second schematic diagram of allocation of a default E-DCH resource configuration in the first embodiment of the present invention.

FIG. 8 shows an example of correspondence between a preamble signature number and an E-DCH resource configuration index in a case that the number of E-DCH resource configurations is smaller than the number of preamble signatures. In this case, for preamble signatures #0-#5, which are equal to or smaller than the number of E-DCH resource configurations, the E-DCH resource configuration index allocated by default matches the preamble signature number, as in the case shown in FIG. 7. However, for the preamble signature #6 and subsequent ones, the number of E-DCH resource configurations to be allocated is not enough. Thus, according to EQ. (4), the preamble signature number is divided by the total number of E-DCH resource configurations, and an E-DCH resource configuration index corresponding to the remainder thereof is allocated by default.

By the processing, a default E-DCH resource configuration can be allocated regardless of the number of E-DCH resource configurations.

Figure 9:
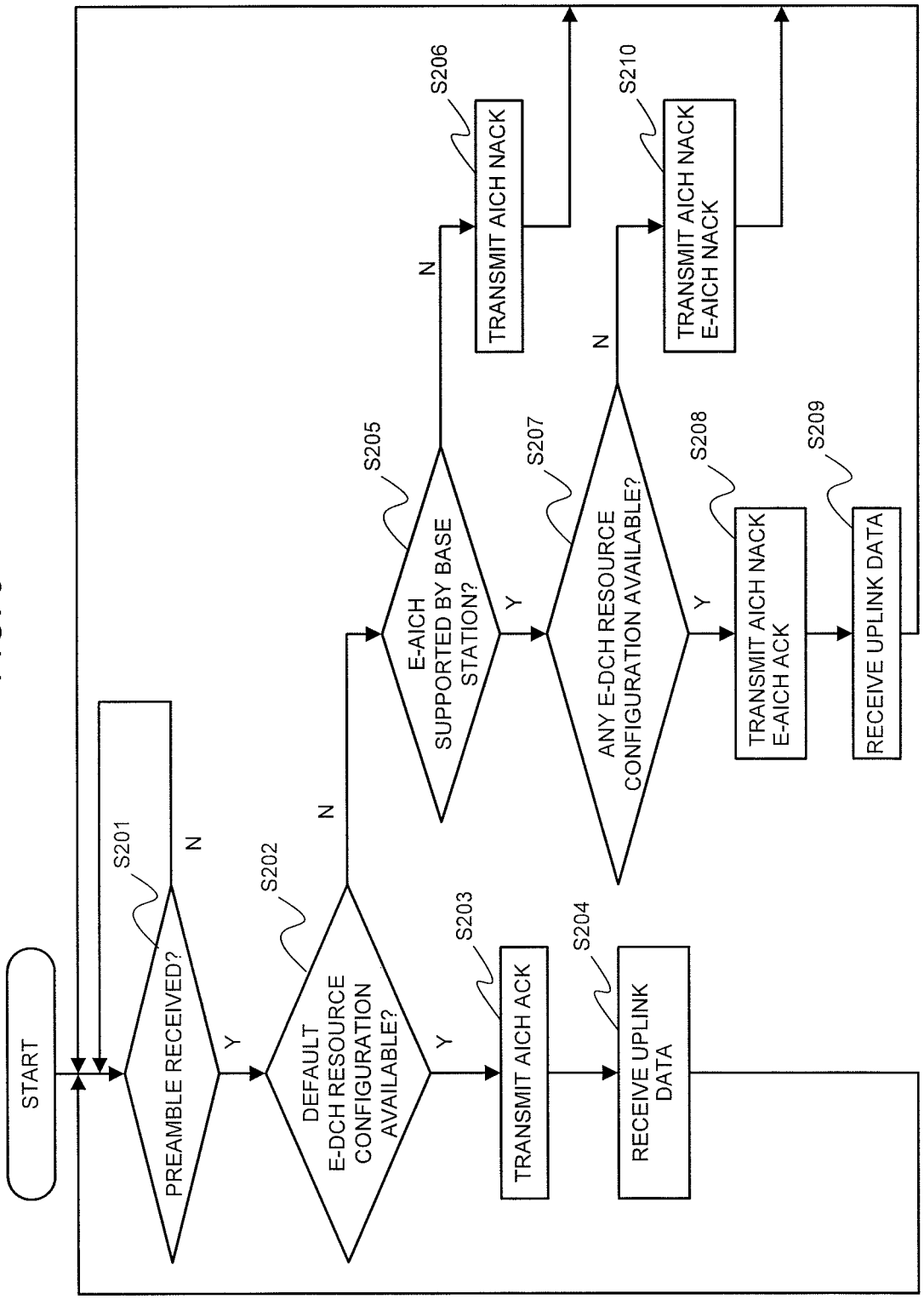
FIG. 9 A flow chart showing an operation of the base station in the first and second embodiments of the present invention.

FIG. 9 is a flow chart showing an operation of the base station, particularly, the E-DCH resource configuration control section 109 in the AICH/E-AICH response condition decision step for deciding a response for AICH/E-AICH.

The base station checks whether a preamble transmitted by a mobile station is received (Step S201), and in a case that no preamble is received, it returns to a preamble reception wait state. In a case that a preamble is received at Step S201, a decision is made as to whether a default E-DCH resource configuration corresponding to the received preamble signature is available (Step S202). In a case that the default E-DCH resource configuration is available, the base station uses AICH to send a responsive notification ACK (Step S203), receives uplink data transmitted by the mobile station (Step S204), and returns to the preamble reception wait state at Step S201.

At Step S202, in a case that the default E-DCH resource configuration is not available, the base station decides whether E-AICH is supported (Step S205). In a case that E-AICH is not supported, AICH is used to send a responsive notification NACK (Step S206), and the base station returns to the preamble reception wait state at Step S201.

At Step S205, in a case that E-AICH is supported, a decision is made as to whether a different E-DCH resource configuration is available (Step S207). In a case that a non-default E-DCH configuration is available in the E-DCH resource configuration list at Step S207, one of them is selected. Moreover, from the responsive notification NACK using AICH and an offset value between the default E-DCH resource configuration and the selected E-DCH resource configuration, an E-AICH signature and an E-AICH signature state are obtained, and transmitted using E-AICH (Step S208). The base station receives uplink data transmitted by the mobile station (Step S209), and returns to the preamble reception wait state at Step S201.

In a case that none of E-DCH resource configurations is available at Step S207, a responsive notification NACK using AICH and a responsive notification NACK using E-AICH are sent (Step S210), and the base station returns to the preamble reception wait state at Step S201.

Now the operation at Step S207 will be concretely illustrated with reference to Tables 4 and 5. The E-DCH resource configuration control section 109 keeps information representing whether an E-DCH resource configuration is available. In Tables 4 and 5, 'Busy' represents the resource configuration is busy and 'Available' represents the resource configuration is available. While the binary value is taken in the description here, information representing the status of an E-DCH resource configuration is not limited to such a binary value. Moreover, in the examples shown in Tables 4 and 5, a default E-DCH resource configuration is assumed to be that with an E-DCH resource configuration index #0.

Table 4 shows an example in which an E-DCH resource configuration is available in the E-DCH resource configuration list. Since the default E-DCH resource configuration is busy, the base station selects an E-DCH resource configuration index #4, which is available. Since an offset between the default E-DCH resource configuration and the selected E-DCH resource configuration is four, the base station obtains an E-AICH signature of #2 and an E-AICH state of +1 based on Table 3. Moreover, information including the E-AICH state of +1 is sent to the mobile station using E-AICH, along with an E-AICH signature pattern corresponding to the E-AICH signature #2.

Table 5 shows an example in which no E-DCH resource configuration is available in the E-DCH resource configuration list. This example shows a case in which no E-DCH resource configuration is available, so that the base station transmits NACK. Based on Table 3, NACK corresponds to an E-AICH signature #0 and an E-AICH state of +1. Hence, information containing an E-AICH state of +1 is sent to the mobile station using E-AICH along with an E-AICH signature pattern corresponding to the E-AICH signature #0.

TABLE 4

| E-DCH resource index | Default E-DCH resource assignment | Status |
|---|---|---|
| 0 | Default E-DCH resource configuration | Busy |
| 1 | | Busy |
| 2 | | Busy |
| 3 | | Busy |
| 4 | | Available |

TABLE 5

| E-DCH resource index | Default E-DCH resource assignment | Status |
|---|---|---|
| 0 | Default E-DCH resource configuration | Busy |
| 1 | | Busy |
| 2 | | Busy |
| 3 | | Busy |
| 4 | | Busy |

Figure 10:
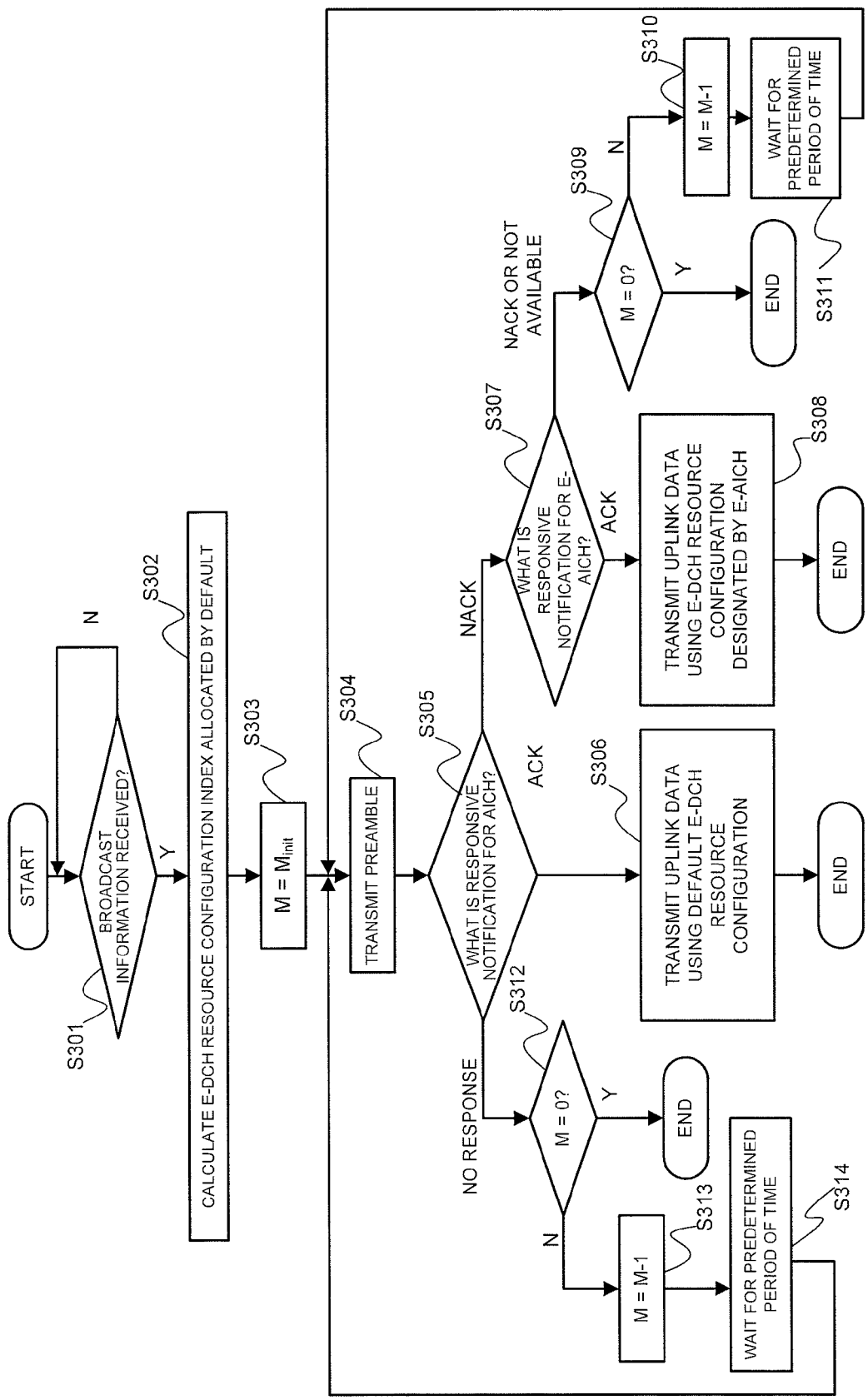
FIG. 10 A flow chart showing an operation of the mobile station in the first and second embodiments of the present invention.

FIG. 10 is a flow chart showing an operation of the mobile station, particularly, the transmission data control section 204, in this embodiment. In response to the event of transmission data appearing in the buffer 207, the mobile station starts a control operation in FIG. 10. The mobile station decides whether broadcast information is received from a base station (Step S301). In a case that broadcast information is received, a default E-DCH resource configuration to be allocated for each preamble signature number is calculated from the broadcast information according to the aforementioned method (Step S302), and a retransmission counter M is initialized to an initial value Minit (Step S303). In a case that no broadcast information is received, the mobile station waits for reception of broadcast information, and the flow goes back to Step S301. After Step S303, processing at the preamble transmitting step for transmitting a preamble to the base station is performed (Step S304). Thereafter, the mobile station turns to an AICH/E-AICH responsive notification reception wait state in which a responsive notification from the base station is waited for, and a responsive notification for AICH is checked (Step S305).

At Step S305, in a case that a responsive notification from the base station using AICH is ACK, the mobile station uses the default E-DCH resource configuration calculated at Step S302 to determine an E-DCH transmission profile, transmits uplink data to the base station (Step S306), and the process is terminated.

In a case that a responsive notification from the base station using AICH is NACK at Step S305, an E-AICH signature pattern is used to decode an E-AICH signature. The resulting E-AICH signature from decoding and the E-AICH signature state are used in combination to check a responsive notification for E-AICH (Step S307). In a case that the responsive notification using E-AICH contains an offset value indicating an E-DCH resource configuration at Step S307, an offset E-DCH resource configuration is used to determine an E-DCH transmission profile, uplink data is transmitted to the base station (Step S308), and the process is terminated. In a case that the responsive notification for E-AICH is NACK, or the base station notifies the mobile station that E-AICH is not supported at Step S307, a retransmission counter M is checked whether it is zero (Step S309). In a case that the retransmission counter M is zero, data transmission is aborted and the process is terminated. In a case that the result at Step S309 is non-zero, the retransmission counter M is decremented by one (Step S310), a predetermined period of time is waited (Step S311), and the flow goes back to the preamble transmitting step (Step S304).

At Step S305, in a case that no responsive notification for AICH is received from the base station for a predetermined period of time, the remaining count of the retransmission counter M is checked (Step S312). In a case that the remaining count of the retransmission counter is zero, data transmission is aborted and the process is terminated. In a case that the result at Step S309 is non-zero, the retransmission counter M is decremented by one (Step S313), a predetermined period of time is waited (Step S314), and the flow goes back to the preamble transmitting step (Step S304).

In this embodiment, since a default E-DCH resource configuration to be allocated for each preamble signature is calculated from existing broadcast information, the need for adding the amount of broadcast information is eliminated and a decrease of downlink wireless capacity can be prevented.

While the description in this embodiment has addressed a case in which the preamble signature number is used in determining a default E-DCH resource configuration, a value calculated from the preamble signature number, such as, for example, A×(preamble signature number)+B (where A and B are zero, or positive or negative integers), may be employed in place of the preamble signature number itself. Moreover, the value for use in calculation of the remainder is not limited to the preamble signature number, and it may be a value for identifying the time such as a slot number with which the mobile station has transmitted RACH, or a number for identifying each mobile station.

Moreover, while in this embodiment, the description has addressed a case in which the total number of E-DCH resource configurations is used in determining a default E-DCH resource configuration, it is not necessary to use the total number, and a mode in which a number less than the total number of E-DCH resource configurations is used may be contemplated. By taking such a mode, an E-DCH resource configuration that is not set by default can be specified for any mobile station to provide an effect that an E-DCH resource configuration to be used can be flexibly selected.

It should be noted that in obtaining correspondence between the preamble signature number and default E-DCH resource configuration, the obtainment is not limited to the mode in which a remainder is taken as in this embodiment, and any mode that can support a range of the total number of E-DCH resource configurations, such as one employing a hash function, may be contemplated.

While the description in this embodiment has addressed a case in which the resource configuration is an E-DCH resource configuration, it is obvious that any system that transmits data using a resource configuration corresponding to a default resource configuration when a mobile station has received the aforementioned first response may be employed and the resource configuration is not limited to the E-DCH resource configuration.

Second Embodiment

In this embodiment, a base station is characterized in preparing a plurality of default resource configurations for each preamble signature, preparing a plurality of values of a parameter for calculating a default resource configuration, selecting a value of the parameter, and broadcasting it.

Now an exemplary wireless communications system will be described with reference to FIGS. 9 through 13, in which a resource configuration is an E-DCH resource configuration, a plurality of offsets are provided beforehand to calculate an E-DCH resource configuration index to be allocated by default, and the base station changes a group of default uplink channel resource configurations for use depending upon a utilization state of the group.

In the first embodiment, only one default E-DCH resource configuration is allocated for each preamble signature. This results in a higher probability that a default E-DCH resource configuration is busy when a mobile station transmits a preamble, and an E-DCH resource configuration different from the default one is allocated using E-AICH. Thus, the mobile station cannot know an allocated E-DCH resource configuration until E-AICH is decoded, and the amount of decoding processing at the mobile station is increased.

Moreover, for a base station that does not support an E-AICH, an E-DCH resource configuration other than a default one cannot be allocated using E-AICH, so that the probability of collision of E-DCH resource configurations may be higher. Thus, this embodiment is characterized in that a plurality of default E-DCH resource configuration groups are defined for a preamble signature, and the base station changes a group of default E-DCH resource configurations for use depending upon a utilization state of the group.

FIG. 6 is a data transmission sequence chart in this embodiment. This is similar to that in the first embodiment except for an operation of broadcasting an E-DCH resource configuration list (Step S101) and an operation of calculating an E-DCH resource configuration index to be allocated by default from the broadcast information (Step S102), and explanations for others will be omitted.

Figure 11:
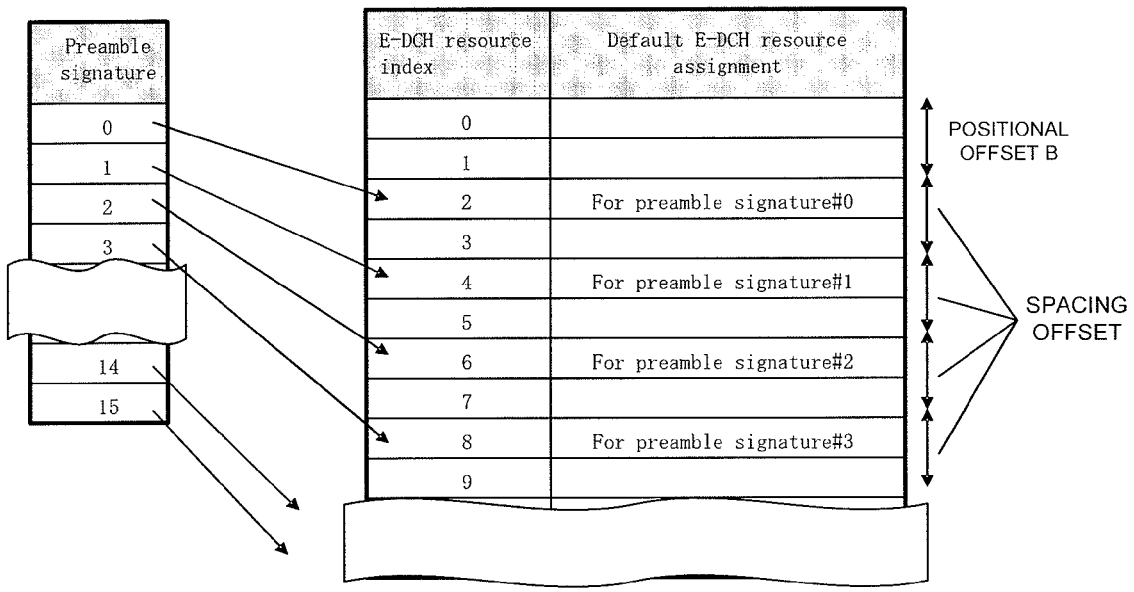
FIG. 11 A first schematic diagram of allocation of a default E-DCH resource configuration in the second embodiment of the present invention.

At Step S101, the base station broadcasts an E-DCH resource configuration list, a preamble signature list available in E-RACH, a positional offset B, and a spacing offset C, which will be described later, to mobile stations within a cell using BCH for each predetermined period of time. The base station manages utilization states of a plurality of default E-DCH resource configuration groups, which will be described later, at the resource configuration control section 109, and modifies the broadcast information depending upon the utilization rates of the default E-DCH resource configuration groups. At Step S102, the mobile station and base station calculate a default E-DCH resource configuration index from the E-DCH resource configuration list, according to the broadcast information based on EQ. (5) below:

[Equation 5]

$$D\text{ind}=(C\times P\text{reind}+B)\bmod Y \quad (5)$$

where, as in the first embodiment, Dind designates an E-DCH resource configuration index to be allocated by default, Preind designates a preamble signature number, and Y designates the total number of E-DCH resource configurations. In the E-DCH resource configuration list, B designates a parameter offsetting the default position (which parameter will be referred to as positional offset hereinbelow), and C designates a parameter representing spacing between default E-DCH resource configuration indices corresponding to preamble signatures having consecutive numbers (which parameter will be referred to as spacing offset). The values of the positional offset B and spacing offset C are periodically broadcast by the base station. FIG. 11 is an example showing allocation of default E-DCH resource configurations based on EQ. (5). In this example, positional offset B=2, and spacing offset C=2.

Now a specific example of the method of modifying broadcast information depending upon utilization rates of default E-DCH resource configuration groups will be described with reference to FIGS. 12 and 13.

Figure 12:
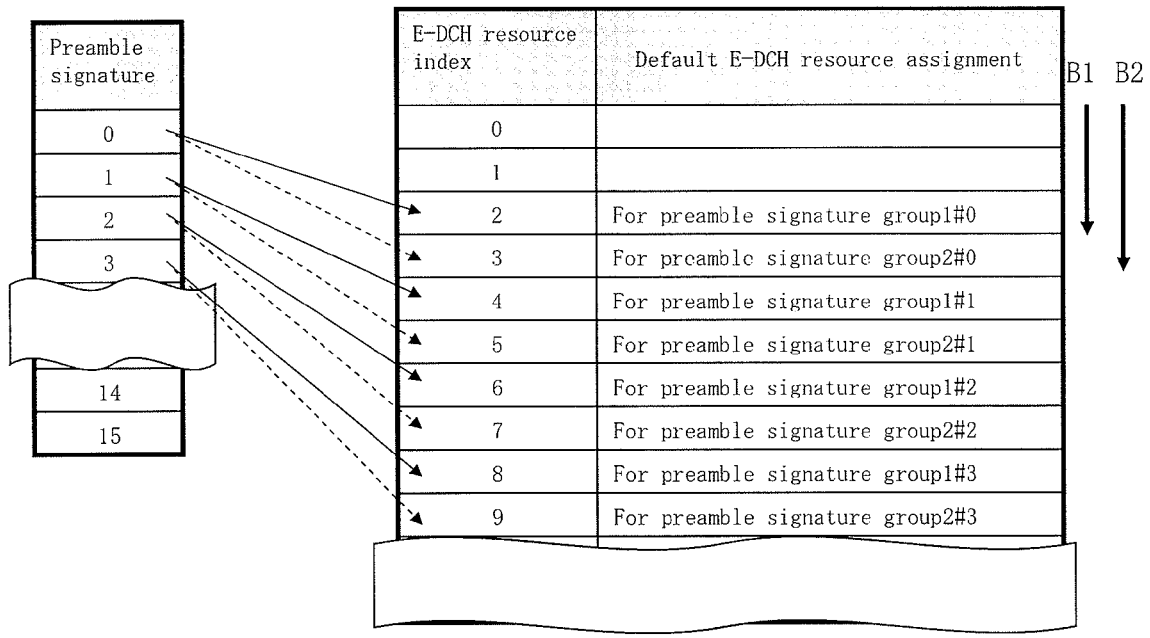
FIG. 12 A second schematic diagram of allocation of a default E-DCH resource configuration in the second embodiment of the present invention.

FIG. 12 is an example showing allocation of default E-DCH resource configurations in this example. FIG. 13 is a flow chart showing an operation of modifying broadcast information at a base station.

In the example of FIG. 12, the base station specifies two default E-DCH resource configurations for each of all signature preambles that are valid within a cell based on EQ. (6) below, and manages each configuration as Default Group. It is assumed here that C1=2, B1=2, and B2=3, and Default Group 1 is used for initial setting.

[Equation 6]

$$\text{Default Group1} = (C1 \times Preind + B1) \bmod Y$$

$$\text{Default Group2} = (C1 \times Preind + B2) \bmod Y \qquad (6)$$

where $C1 > |B2-B1|$

Figure 13:
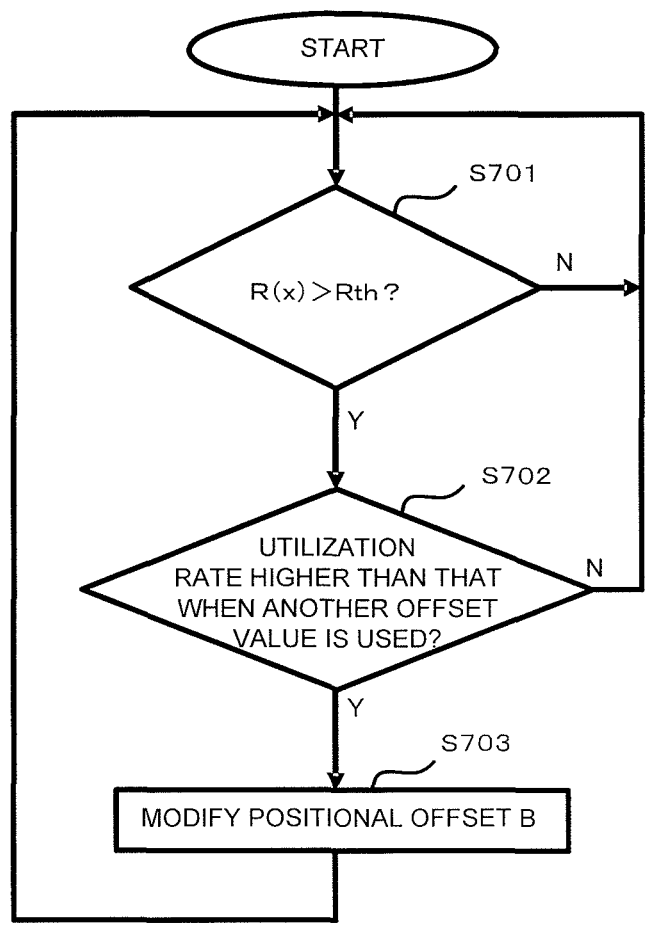
FIG. 13 A flow chart showing an operation of modifying broadcast information in the base station in the second embodiment of the present invention.

In FIG. 13, in response to determination of information to be broadcast for each predetermined period of time, a control operation is started. A utilization rate R(x) for Default Group is calculated based on EQ. (7) below:

[Equation 7]

$$R(x) = Rbusy(x)/Rall(x) \qquad (7)$$

where Rbusy(x) designates the number of busy E-DCH resource configurations in Default Group #x, and Rall(x) designates the total number of E-DCH resource configurations in Default Group #x.

Then, the calculated utilization rate R(x) is compared with a predetermined threshold Rth (Step S701), where x corresponds to the Default Group number. Since Default Group 1 is initially set in this example, R(1) is calculated and compared with the threshold Rth.

In a case that the threshold Rth is not exceeded at Step S701, no modification is applied to the positional offset B, and the flow goes back to Step S701. In a case that the utilization rate R(x) is greater than the threshold Rth, the base station calculates a utilization rate for a Default Group different from the currently used Default Group, and compares it with the utilization rate R(x) (Step S702). In this example, R(2) is calculated for a Default Group 2 different from the currently used Default Group 1 and compared with R(1). In a case that the utilization rate R(x) for the currently used Default Group is lower than that for the Default Group different from the currently used Default Group at Step S702, no modification is applied to the positional offset B and the flow goes back to Step S701.

In a case that the utilization rate R(x) for the currently used Default Group is higher than that for the Default Group different from the currently used Default Group at Step S702, the base station selects a Default Group having a lower utilization rate, and broadcasts a positional offset B corresponding to the Default Group to mobile stations within the cell (Step S703). In this example, in a case that R(1) is higher than R(2), the base station selects a positional offset B2 corresponding to the Default Group having a lower utilization rate, and broadcasts it to mobile stations within the cell.

FIG. 9 is a flow chart showing an operation of a base station in this embodiment, which is similar to that in the first embodiment and description thereof will be omitted.

FIG. 10 is a flow chart showing an operation of a mobile station in this embodiment, which is similar to that in the first embodiment and description thereof will be omitted.

While in this embodiment, two groups of default E-DCH resource configurations are specified and decision is made according to a high or low utilization rate R(x), the number of groups is not limited to two. A similar effect can be provided when three or more groups are specified, and a positional offset value corresponding to a group having the lowest utilization rate R(x) is selected at Step S702.

While in this embodiment, the description has addressed a case in which the base station changes a default E-DCH resource configuration group to be used depending upon a utilization state of the group, a mode in which the group is periodically modified in a cycle of a specified period of time.

According to this embodiment, a plurality of groups of default E-DCH resource configurations are specified for a preamble signature, and a base station changes a default E-DCH resource configuration group to be used depending upon the utilization state of the group, so that the probability that a default E-DCH resource configuration can be used is improved to reduce a frequency at which an E-DCH resource configuration is allocated using E-AICH, thus reducing the processing load on mobile stations.

Moreover, according to this embodiment, a plurality of default E-DCH resource configuration groups are defined for a preamble signature, and a base station changes a default E-DCH resource configuration group to be used depending upon the utilization state of the group, the probability that a default E-DCH resource configuration can be used is improved, thus reducing the probability of collision of E-DCH resource configurations in a base station in which E-AICH cannot be used.

Third Embodiment

In this embodiment, a base station is characterized in preparing a plurality of the aforementioned default resource configurations for each preamble signature, preparing a plurality of values of a parameter for calculating a default resource configuration, and broadcasting them.

Now an exemplary wireless communications system will be described with reference to FIGS. 10, 12, 14, and 15, in which a resource configuration is an E-DCH resource configuration, a plurality of offsets are provided beforehand to calculate an E-DCH resource configuration index to be allocated by default, and a base station uses an appropriate default E-DCH resource configuration group depending upon the time at which a mobile station transmits a preamble.

In the first embodiment, only one default E-DCH resource configuration is allocated for each preamble signature. This results in a higher probability that a default E-DCH resource configuration is busy when a mobile station transmits a preamble, and an E-DCH resource configuration different from the default one is allocated using E-AICH. Thus, the mobile station cannot know an allocated E-DCH resource configuration until E-AICH is decoded, and the amount of decoding processing at the mobile station is increased.

Moreover, for a base station that does not support E-AICH, an E-DCH resource configuration other than a default one cannot be allocated using E-AICH, so that the probability of collision of E-DCH resource configurations may be higher. Thus, this embodiment is characterized in that a plurality of default E-DCH resource configuration groups are defined for each preamble signature, and the base station uses an appropriate default E-DCH resource configuration group depending upon the time at which the mobile station transmits a preamble.

Figure 14:
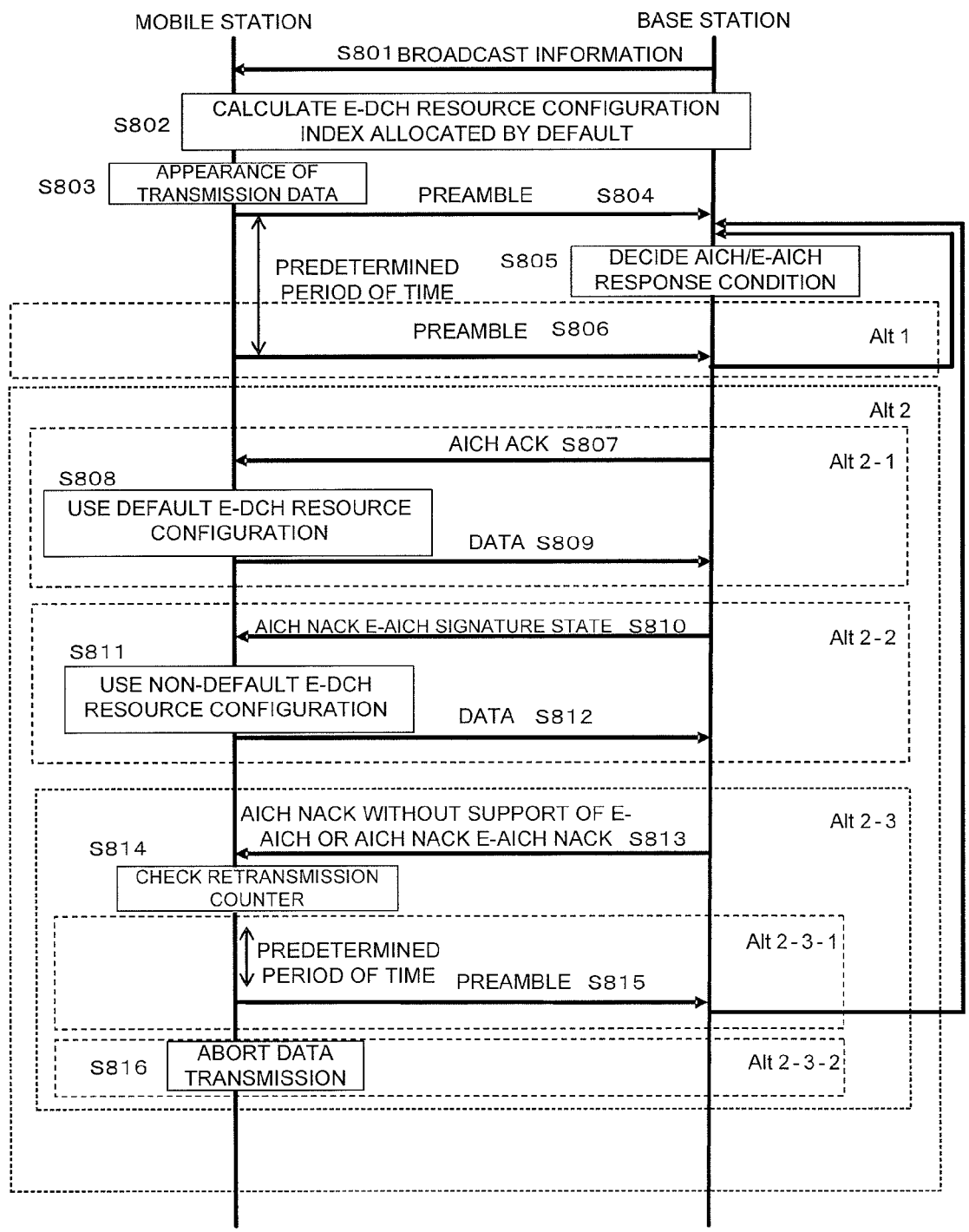
FIG. 14 A sequence chart showing a procedure of data transmission in a third embodiment of the present invention.

FIG. 14 is a data transmission sequence chart in this embodiment. This is similar to that in the first embodiment except for an operation relating to decision of an E-DCH resource configuration group (Steps S801-S807) and an operation of determining an E-DCH resource configuration for use in transmitting uplink data by the mobile station (Step S808 or Step S811), and explanations for others will be omitted.

At Step S801, the base station broadcasts an E-DCH resource configuration list, a preamble signature list available in E-RACH, and two setting values using a positional offset B and an a spacing offset C as defined in the second embodiment, to mobile stations within a cell using BCH for each predetermined period of time. At Step S802, the mobile station and base station calculate a default E-DCH resource configuration index from broadcast information based on EQS. (5) and (6) as in the second embodiment to determine two Default Groups.

Once transmission data has appeared in the buffer 207 in the mobile station (Step S803), the transmission data control section 204 transmits a preamble to the base station (Step S804). Upon receipt of the preamble, the base station decides whether a default E-DCH resource configuration is available (Step S805).

In a case that a default E-DCH resource configuration corresponding to the received preamble signature is not available, and the preamble retransmission counter C does not exceed a threshold Cth at Step S805, the base station increments the retransmission counter by one. The base station makes no special notification to the mobile station, and waits for any action from the mobile station in the processing in Alt 1. In Alt 1, the mobile station retransmits the preamble after a predetermined period of time from the transmission of the preamble at Step S804 according to the method described above (Step S806), and the base station performs processing at Step S805 again. The processing in Alt 1 is also performed in a case that the base station cannot recognize a preamble because, for example, the preamble cannot be received at the base station although it was transmitted by the mobile station. While the description here has addressed a case in which retransmission of a preamble at Step S306 is performed after a predetermined period of time, a mode in which it is performed after a certain access slot has passed may be contemplated.

In a case that a default E-DCH resource configuration corresponding to the received preamble signature is available, or the preamble retransmission counter C is greater than the threshold Cth at Step S805, processing in one of Alt 2-1-Alt 2-3 is performed. In a case that a default E-DCH resource configuration corresponding to the received preamble signature is available, the flow goes to processing in Alt 2-1. In a case that a default E-DCH resource configuration corresponding to the received preamble signature is not available, and the preamble retransmission counter C exceeds the threshold Cth, the flow goes to processing in Alt 2-2. A detailed description of the operation of the base station will be made with reference to FIG. 15. In determining an E-DCH resource configuration for use in transmitting uplink data, such as in Step S808 in Alt 2-1 or Step S811 in Alt 2-2, the mobile station determines a default E-DCH resource configuration from the Default Group 1 in a case that the access slot number with which the preamble is transmitted is even, or determines it from the Default Group 2 in a case that the access slot number with which the preamble is transmitted is odd.

While the description here has addressed a case in which the base station makes no special notification to the mobile station in a case that a default E-DCH resource configuration corresponding to the received preamble signature is not available and the preamble retransmission counter C does not exceed the threshold Cth at Step S805, a mode in which a base station that does not support E-AICH transmits a responsive notification NACK using AICH as in Alt 2-3, and a base station that supports E-AICH transmits a responsive notification NACK using AICH and E-AICH may be contemplated.

Figure 15:
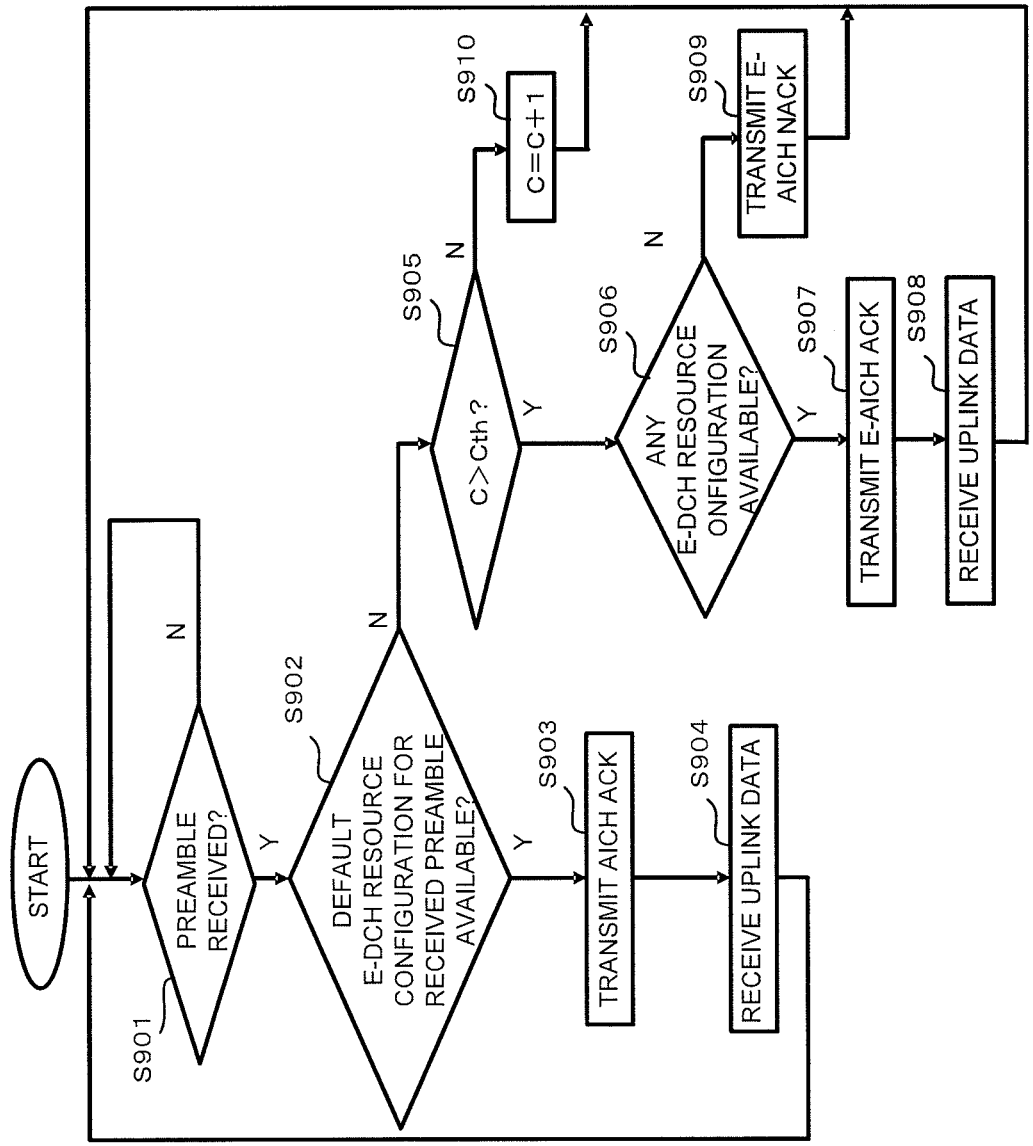
FIG. 15 A flow chart showing an operation of the base station in the third embodiment of the present invention.

FIG. 15 is a flow chart showing an operation of the base station, particularly, the resource configuration control section 109, at Step S805 for deciding a response for AICH/E-AICH in this embodiment. The base station checks whether a preamble transmitted by the mobile station is received (Step S901), and in a case that no preamble is received, it returns to a preamble reception wait state. In a case that a preamble is received at Step S901, a decision is made as to whether a default E-DCH resource configuration allocated to the received preamble is available taking account of the access slot number with which the mobile station has transmitted the preamble (Step S902). In a case that the default E-DCH resource configuration allocated for the received time is available, the base station uses AICH to send a responsive notification ACK (Step S903), receives uplink data transmitted by the mobile station (Step S904), and returns to the preamble reception wait state at Step S901.

At Step S902, in a case that a default E-DCH resource configuration allocated to the received preamble is not available, the base station decides whether the preamble wait counter C exceeds the threshold Cth (Step S905). In a case that the preamble wait counter C exceeds the threshold Cth at Step S905, the base station decides whether a non-default E-DCH configuration is available in the E-DCH resource configuration list (Step S906).

In a case that a non-default E-DCH resource configuration is available in the E-DCH resource configuration list at Step S906, one of those in the list is selected, a responsive notification NACK using AICH is transmitted and along therewith, an E-AICH signature and an E-AICH signature state are obtained from an offset value between the default E-DCH resource configuration and the selected E-DCH resource configuration, and an E-AICH signature pattern corresponding to the E-AICH signature is used to transmit E-AICH including the E-AICH signature state (Step S907). The base station receives uplink data transmitted by the mobile station (Step S908), and returns to the preamble reception wait state at Step S901.

In a case that no non-default E-DCH resource configuration is available in the E-DCH resource configuration list at Step S906, the base station sends a responsive notification NACK using AICH and a responsive notification NACK using E-AICH (Step S909), and returns to the preamble reception wait state at Step S901.

In a case that the timing wait counter C does not exceed the threshold Cth at Step 905, the base station adds one to the timing wait counter C (Step S910), and returns to the preamble reception wait state at Step S901.

FIG. 8 is a flow chart showing an operation of the mobile station in this embodiment, which is similar to that in the first embodiment and description thereof will be omitted.

While in this embodiment, two default E-DCH resource configuration groups are set, and a group to be used is decided according to evenness or oddness of the access slot with which a preamble is transmitted, a similar effect can be obtained by setting three or more groups and dividing access slots in the same number to decide a group to be used.

For example, when the retransmission interval for a preamble is an odd number of access slots, in a case that two default E-DCH resource configuration groups are set, an even-numbered access slot and an odd-numbered access slot are cycled to transmit a preamble, and therefore, the base station can alternately use an appropriate default E-DCH resource configuration group.

Moreover, when the transmission interval for a preamble is an even number of access slots, a default E-DCH resource configuration group may be appropriately used by setting three or more such groups.

While the description of this embodiment has addressed a case in which a group to be used is changed depending upon the time at which the mobile station transmits a preamble, a mode in which a group to be used is changed periodically depending upon a specified time may be contemplated.

This embodiment is characterized in that at least a value obtained from the total number of resource configurations is used to define a plurality of default E-DCH resource configuration groups for one preamble signature, and the base station uses an appropriate default E-DCH resource configuration group depending upon the time at which a mobile station transmits a preamble.

According to this embodiment, a plurality of default E-DCH resource configuration groups are defined for a preamble signature, and depending upon the time at which a mobile station transmits a preamble, a base station uses an appropriate default E-DCH resource configuration group, whereby reduction of the processing load on the mobile station can be expected. This is because the frequency at which a non-default E-DCH resource configuration is allocated using E-AICH can be reduced by using an appropriate default E-DCH resource configuration group to improve the probability that a default E-DCH resource configuration can be used.

Moreover, a plurality of default E-DCH resource configuration groups are defined for a preamble signature, and depending upon the time at which a mobile station transmits a preamble, a base station uses an appropriate default E-DCH resource configuration group to improve the probability that a default E-DCH resource configuration can be used, whereby the probability of collision of E-DCH resource configurations is reduced.

The present invention is applicable to a wireless communications system in which a plurality of wireless communication apparatuses use an uplink channel to access a base station.

The present application claims priority based on Japanese Patent Application No. 2008-072580 filed on Mar. 19, 2008, disclosure of which is incorporated herein in its entirety.

The invention claimed is:

1. A communication system including at least one mobile station, said communication system further comprising: a base station which receives a preamble transmitted by said at least one mobile station, and transmits a response to the received preamble to said at least one mobile station, and
in case that said response is a first response, said at least one mobile station performs a signal transmission using a resource corresponding to an index determined by a default resource configuration index (Dind) and at least a value obtained from a first signature included in a signal transmitted from said base station,
wherein said default resource configuration index Dind is represented as Dind=PreInd mod Y, wherein Y represents a total number of resources, and PreInd represents a preamble signature number for identifying a second signature used for said preamble.

2. A communications system according to claim 1, wherein said mobile station determines said default resource configuration for use in said transmission further using a value obtained from a preamble signature number for identifying a preamble signature for use in said preamble.

3. A communications system according to claim 1, wherein said base station prepares a plurality of said default resource configurations for each said preamble signature.

4. A communications system according to claim 3, wherein said base station prepares a plurality of values of a parameter for calculating said default resource configuration, selects a value of said parameter, and broadcasts it.

5. A communications system according to claim 4, wherein, in a case that a predetermined condition is satisfied, said base station modifies said parameter to another value.

6. A communications system according to claim 3, wherein said base station prepares a plurality of values of the parameter for calculating said default resource configuration, and broadcasts them.

7. A communications system according to claim 6, wherein said mobile station keeps said broadcast parameter, selects one of the values of said parameter based on a predetermined condition.

8. A communications system according to claim 7, wherein said predetermined condition is time at which said preamble is transmitted.

9. A communications system according to claim 1, wherein a response to said preamble is transmitted using Acquisition Indicator Channel (AICH).

10. A communications system according to claim 1, wherein said resource configuration is Enhanced Dedicated Channel (E-DCH) resource configuration.

11. A communication system comprised of a base station and mobile stations,
wherein said base station receives a preamble transmitted by said mobile station, and transmits a response to the received preamble to said mobile station, and in a case that said response is a first response, said mobile station transmits data using information about at least a part of a default resource configuration of the own mobile station that is determined using a total number of resource configurations or a value obtained from said total number,
wherein said mobile station determines said default resource configuration for use in said transmission further using a value obtained from a preamble signature number for identifying a preamble signature for use in said preamble, and
wherein said mobile station calculates said default resource configuration Dind for use in said transmission as Dind=PreInd mod Y, where said preamble signature number is designated as PreInd, and the total number of resource configurations or a value obtained from said total number is designated as Y.

12. A communication system comprised of a base station and mobile stations,
wherein said base station receives a preamble transmitted by said mobile station, and transmits a response to the received preamble to said mobile station, and in a case that said response is a first response, said mobile station transmits data using information about at least a part of a default resource configuration of the own mobile station that is determined using a total number of resource configurations or a value obtained from said total number, wherein said base station prepares a plurality of said default resource configurations for each said preamble signature, wherein said base station prepares a plurality of values of a parameter for calculating said default resource configuration, selects a value of said parameter, and broadcasts it, and wherein said parameter is comprised of a positional offset and a spacing offset, and said base station calculates a default resource configuration Dind for each group as Dind=(Cj×PreInd+Bi) mod Y, where the positional offset is designated as Bi (i=1, . . . , N; N is a natural number), and the spacing offset is designated as Cj (j=1, . . . , L; L is a natural number).

13. A communication system comprised of a base station and mobile stations, wherein said base station receives a preamble transmitted by said mobile station, and transmits a response to the received preamble to said mobile station, and in a case that said response is a first response, said mobile station transmits data using information about at least a part of a default resource configuration of the own mobile station that is determined using a total number of resource configurations or a value obtained from said total number, wherein said base station prepares a plurality of said default resource configurations for each said preamble signature, wherein said base station prepares a plurality of values of a parameter for calculating said default resource configuration, selects a value of said parameter, and broadcasts it, and wherein in a case that a predetermined condition is satisfied, said base station modifies said parameter to another value, and wherein said predetermined condition is based on a utilization rate obtained from the number of default resource configurations that can be determined from the value of said parameter and the number of busy ones among them.

14. A base station which receives a preamble from a mobile station and transmits a response to said preamble to said mobile station, wherein, in case that said response is a first response, said mobile station performs a signal transmission by using a resource corresponding to an index determined by a default resource configuration index (Dind) and at least a value obtained from a first signature included in a signal transmitted from said base station, and wherein said default resource configuration index Dind is represented as Dind=PreInd mod Y, wherein Y represents a total number of resources, and PreInd represents a preamble signature number for identifying a second signature used for said preamble.

15. A base station according to claim 14, wherein said base station determines said default resource configuration for use in said determination of a responsive notification further using a value obtained from a preamble signature number for identifying a preamble signature for use in said preamble.

16. A base station according to claim 14, wherein said base station prepares a plurality of said default resource configurations for each said preamble signature.

17. A base station according to claim 16, wherein said base station prepares a plurality of values of a parameter for calculating said default resource configuration, selects a value of said parameter, and broadcasts it.

18. A base station according to claim 16, wherein said base station prepares a plurality of values of the parameter for calculating said default resource configuration, and broadcasts them.

19. A base station that determines a responsive notification in response to a preamble transmitted by a mobile station based on a default resource configuration determined using a total number of resource configurations or a value obtained from said total number, wherein said base station determines said default resource configuration for use in said determination of the responsive notification further using a value obtained from a preamble signature number for identifying a preamble signature for use in said preamble, and wherein said base station calculates said default resource configuration Dind for use in said determination of a response as Dind=PreInd mod Y, where said preamble signature number is designated as PreInd, and the total number of resource configurations or a value obtained from said total number is designated as Y.

20. A mobile station, for transmitting a preamble to a base station, which receives a response to said preamble from said base station, and in case that said response is a first response, said mobile station performs a signal transmission by using a resource corresponding to an index determined by a default resource configuration index (Dind) and at least a value obtained from a second signature included in a signal transmitted from said base station, wherein said default resource configuration index Dind is represented as Dind=PreInd mod Y, wherein Y represents a total number of resources, and PreInd represents a preamble sing signature number for identifying a first signature used for said preamble.

21. A mobile station according to claim 20, wherein said mobile station determines said default resource configuration for use in said transmission further using a value obtained from a preamble signature number for identifying a preamble signature for use in said preamble.

22. A mobile station according to claim 20, wherein said mobile station calculates said default resource configuration based on a parameter broadcast by said base station.

23. A mobile station for transmitting a preamble to a base station, wherein said mobile station receives a response to said preamble from said base station, and in a case that said response is a first response, said mobile station transmits data using information about at least a part of a resource configuration that is determined as a default resource configuration of the own mobile station using a total number of resource configurations or a value obtained from said total number, wherein said mobile station determines said default resource configuration for use in said transmission further using a value obtained from a preamble signature number for identifying a preamble signature for use in said preamble, and wherein said mobile station calculates said default resource configuration Dind for use in said transmission as Dind=PreInd mod Y, where said preamble signature number is designated as PreInd, and the total number of resource configurations or a value obtained from said total number is designated as Y.

24. A response determination method for a base station, comprising:

receiving a preamble from a mobile station, and transmitting a response to said preamble to said mobile station, in case that said response is a first response, performing, at said mobile station, a signal transmission by using a resource corresponding to an index determined by a default resource configuration index (Dind) and at least a value obtained from a first signature included in a signal transmitted from said base station, wherein said default resource configuration index Dind is represented as Dind=PreInd mod Y, wherein Y represents a total number of resources, and PreInd represents a preamble signature number for identifying a second signature used for said preamble.

25. A response determination method according to claim 24, comprising determining said default resource configuration for use in said determination of a responsive notification further using a value obtained from a preamble signature number for identifying a preamble signature for use in said preamble.

26. A response determination method according to claim 24, wherein said base station prepares a plurality of said default resource configurations for each said preamble signature.

27. A response determination method according to claim 26, wherein said base station has steps of preparing a plurality of values of a parameter for calculating said default resource configuration, selecting a value of said parameter, and broadcasting it.

28. A response determination method according to claim 26, wherein said base station has steps of preparing a plurality of values of the parameter for calculating said default resource configuration, and broadcasting them.

29. A response determination method for a base station, comprising:

determining a responsive notification in response to a preamble transmitted by a mobile station based on a default resource configuration determined using a total number of resource configurations or a value obtained from said total number, determining said default resource configuration for use in said determination of a responsive notification further using a value obtained from a preamble signature number for identifying a preamble signature for use in said preamble, and calculating said default resource configuration Dind for use in said determination of a response as Dind=PreInd mod Y, where said preamble signature number is designated as PreInd, and the total number of resource configurations or a value obtained from said total number is designated as Y.

30. A resource configuration determination method for a mobile station, comprising:

receiving a response to a preamble from a base station, and in case that said response is a first response, performing a signal transmission by using a resource corresponding to an index determined by a default resource configuration index (Dind) and at least a value obtained from a second signature included in a signal transmitted from said base station, wherein said default resource configuration index Dind is represented as Dind=PreInd mod Y, wherein Y represents a total number of resources, and PreInd represents a preamble signature number for identifying a first signature used for said preamble.

31. A resource configuration determination method according to claim 30, comprising determining said default resource configuration further using a value obtained from a preamble signature number for identifying a preamble signature for use in said preamble.

32. A resource configuration determination method according to claim 30, wherein said mobile station calculates said default resource configuration based on a parameter broadcast by said base station.

* * * * *

UNITED STATES PATENT AND TRADEMARK OFFICE
CERTIFICATE OF CORRECTION

PATENT NO. : 8,570,886 B2
APPLICATION NO. : 12/920419
DATED : October 29, 2013
INVENTOR(S) : Hiroaki Aminaka and Jinsock Lee Page 1 of 1

It is certified that error appears in the above-identified patent and that said Letters Patent is hereby corrected as shown below:

In the Claims

Column 26, Line 37: In Claim 20, after "preamble" delete "sing"

Signed and Sealed this
Eleventh Day of November, 2014

Michelle K. Lee
*Deputy Director of the United States Patent and Trademark Office*